(12) United States Patent
Matsushita et al.

(10) Patent No.: US 11,052,530 B2
(45) Date of Patent: Jul. 6, 2021

(54) ELECTRIC WORK MACHINE

(71) Applicant: HITACHI KOKI CO., LTD., Tokyo (JP)

(72) Inventors: Akira Matsushita, Ibaraki (JP); Tomomasa Nishikawa, Ibaraki (JP); Yuta Noguchi, Ibaraki (JP); Kuniaki Kanbe, Ibaraki (JP); Shingo Yamazaki, Ibaraki (JP)

(73) Assignee: KOKI HOLDINGS CO., LTD., Tokyo (JP)

(*) Notice: Subject to any disclaimer, the term of this patent is extended or adjusted under 35 U.S.C. 154(b) by 620 days.

(21) Appl. No.: 15/523,358

(22) PCT Filed: Sep. 29, 2015

(86) PCT No.: PCT/JP2015/077481
§ 371 (c)(1),
(2) Date: Apr. 28, 2017

(87) PCT Pub. No.: WO2016/067810
PCT Pub. Date: May 6, 2016

(65) Prior Publication Data
US 2017/0239804 A1 Aug. 24, 2017

(30) Foreign Application Priority Data

Oct. 31, 2014 (JP) .............................. JP2014-223404

(51) Int. Cl.
*B25F 5/00* (2006.01)
*H02K 11/33* (2016.01)
(Continued)

(52) U.S. Cl.
CPC ............... *B25F 5/008* (2013.01); *H02K 9/06* (2013.01); *H02K 11/33* (2016.01); *H02P 6/16* (2013.01)

(58) Field of Classification Search
CPC .................................. B25F 5/008; H02K 9/06
(Continued)

(56) References Cited

U.S. PATENT DOCUMENTS 3,818,255 A * 6/1974 Wagner ................... B25F 5/008
310/50
6,123,158 A * 9/2000 Steffen ................... H02K 11/33
173/117

(Continued)

FOREIGN PATENT DOCUMENTS

CN 102149515 A 8/2011
JP 2010-173042 A 8/2010
(Continued)

OTHER PUBLICATIONS

Extended European Search Report issued in corresponding EP Patent Application No. 15854804.0, dated Jun. 4, 2018.
(Continued)

*Primary Examiner* — Valentin Neacsu
(74) *Attorney, Agent, or Firm* — McDermott Will & Emery LLP

(57) ABSTRACT

Provided is an electric work machine that can suppress a temperature increase of a component controlling an electric motor. The electric work machine including a brushless motor that operates a tip tool includes a rectification circuit that converts a voltage to be applied to the brushless motor from an alternating current voltage to a direct current voltage, and a switching circuit that controls the brushless motor, and the rectification circuit is arranged upstream of the switching circuit in a circulation path of the air that cools the rectification circuit and the switching circuit.

16 Claims, 16 Drawing Sheets

Figure 1:
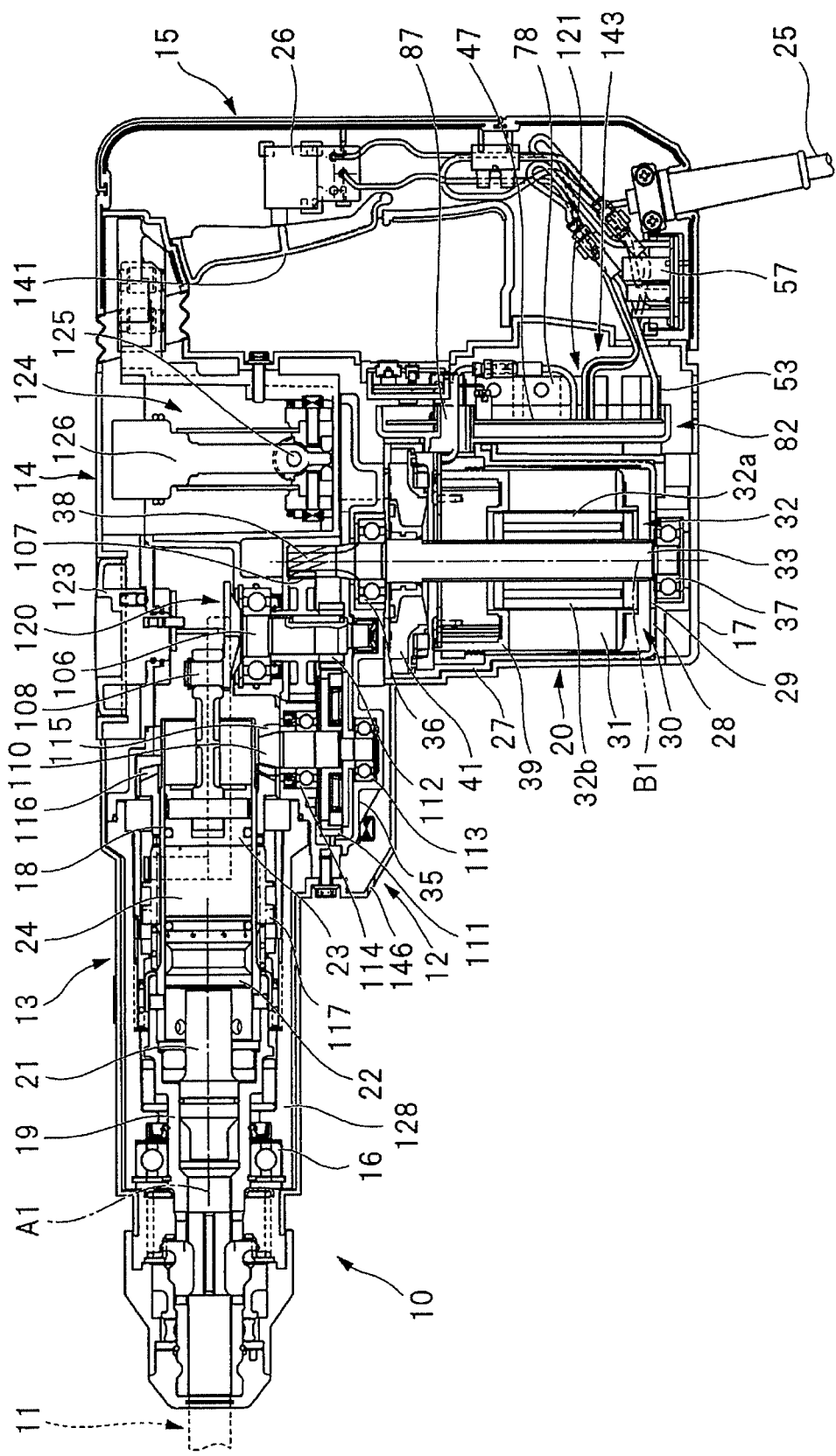

(51) Int. Cl.
*H02K 9/06* (2006.01)
*H02P 6/16* (2016.01)

(58) Field of Classification Search
USPC .... 173/170, 2; 310/47, 50, 52, 58–59, 60 A, 310/62, 64–65
See application file for complete search history.

(56) References Cited

U.S. PATENT DOCUMENTS

| | | | | |
|---|---|---|---|---|
| 6,320,286 B1* | 11/2001 | Ramarathnam | ........ | H02K 7/145 310/47 |
| 6,325,157 B1* | 12/2001 | Arakawa | ................ | B25D 16/00 173/117 |
| 6,543,549 B1* | 4/2003 | Riedl | ...................... | B25B 21/00 173/171 |
| 6,866,105 B2* | 3/2005 | Pfisterer | ................. | B25D 17/20 173/117 |
| 7,166,939 B2* | 1/2007 | Voigt | ...................... | B25F 5/008 310/47 |
| 7,308,950 B2* | 12/2007 | Faatz | ...................... | B25F 5/008 173/170 |
| 8,084,901 B2* | 12/2011 | Oomori | ................... | B25F 5/008 310/50 |
| 8,338,997 B2* | 12/2012 | Nishikawa | .............. | B25B 21/00 310/58 |
| 8,627,900 B2* | 1/2014 | Oomori | ................... | B25F 5/008 173/168 |
| 8,698,362 B2* | 4/2014 | Esenwein | ............. | B24B 23/028 310/50 |
| 8,816,544 B2 | 8/2014 | Tanimoto et al. | | |
| 9,126,320 B2* | 9/2015 | Shinma | .................. | B25D 17/20 |
| 9,132,542 B2* | 9/2015 | Lau | ........................ | B25F 5/008 |
| 2002/0182020 A1* | 12/2002 | Oomori | .................... | H02K 9/06 408/124 |
| 2004/0027010 A1* | 2/2004 | Oomori | ................... | H02K 9/06 310/50 |
| 2004/0124721 A1* | 7/2004 | Pfisterer | ................. | B25D 17/20 310/51 |
| 2005/0202310 A1* | 9/2005 | Yahnker | ................ | B25F 5/008 429/62 |
| 2006/0255756 A1* | 11/2006 | Iwata | ................ | B25F 5/008 318/400.41 |
| 2007/0188119 A1* | 8/2007 | Sonoda | ................. | H02M 7/003 318/400.21 |
| 2007/0257568 A1* | 11/2007 | Akita | .................... | H01L 25/071 310/64 |
| 2010/0117580 A1* | 5/2010 | Miwa | ........................ | B25F 5/00 318/472 |
| 2010/0123359 A1* | 5/2010 | Nishikawa | .............. | B25B 21/00 310/50 |
| 2011/0171887 A1* | 7/2011 | Tanimoto | .............. | B24B 23/028 451/359 |
| 2011/0180286 A1* | 7/2011 | Oomori | ................... | B25F 5/008 173/20 |
| 2012/0014065 A1* | 1/2012 | Haga | ..................... | B25B 21/002 361/697 |
| 2012/0262884 A1* | 10/2012 | Meinecke | ............. | H02M 7/757 361/722 |
| 2013/0313925 A1* | 11/2013 | Mergener | .................. | B25F 5/00 310/50 |
| 2014/0239751 A1* | 8/2014 | Tokairin | ................ | H02K 7/145 310/50 |
| 2014/0265664 A1* | 9/2014 | Camilleri | ............... | H02K 15/14 310/59 |
| 2015/0015094 A1* | 1/2015 | Haga | ..................... | B25B 21/002 310/50 |
| 2015/0026985 A1* | 1/2015 | Yamaguchi | ............ | B23D 45/16 30/123 |
| 2015/0054356 A1* | 2/2015 | Chapel | ................. | H05K 1/0204 307/139 |
| 2015/0111480 A1* | 4/2015 | Vanko | ..................... | B25F 5/008 451/359 |
| 2015/0288259 A1* | 10/2015 | Koizumi | ................... | B25F 5/02 173/170 |

FOREIGN PATENT DOCUMENTS

| | | |
|---|---|---|
| JP | 2011-062770 A | 3/2011 |
| JP | 2012-020363 A | 2/2012 |
| JP | 2013-094866 A | 5/2013 |
| WO | 2014/123070 A1 | 8/2014 |

OTHER PUBLICATIONS

Search Report issued in corresponding International Patent Application No. PCT/JP2015/077481, dated Nov. 24, 2015.
Chinese Office Action issued in corresponding Chinese Patent Application No. 201580058697.0, dated Oct. 31, 2019, with English translation.

* cited by examiner

FIG. 6
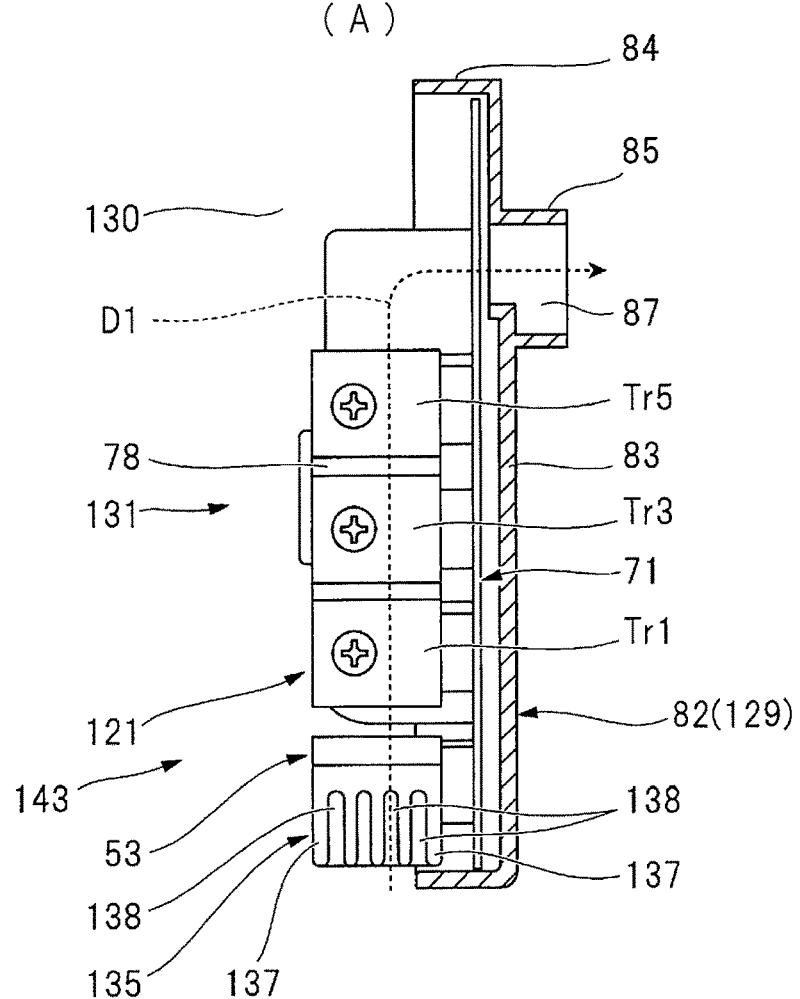
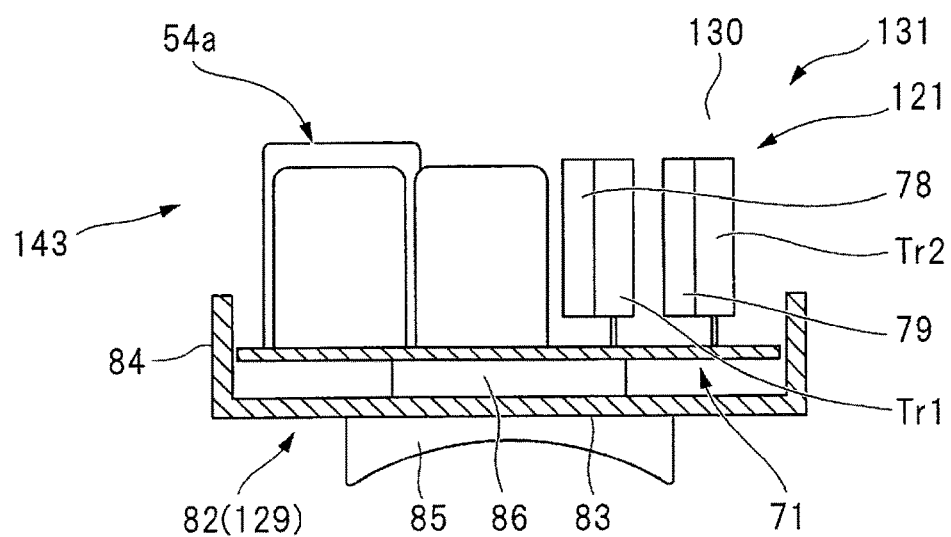

FIG. 10
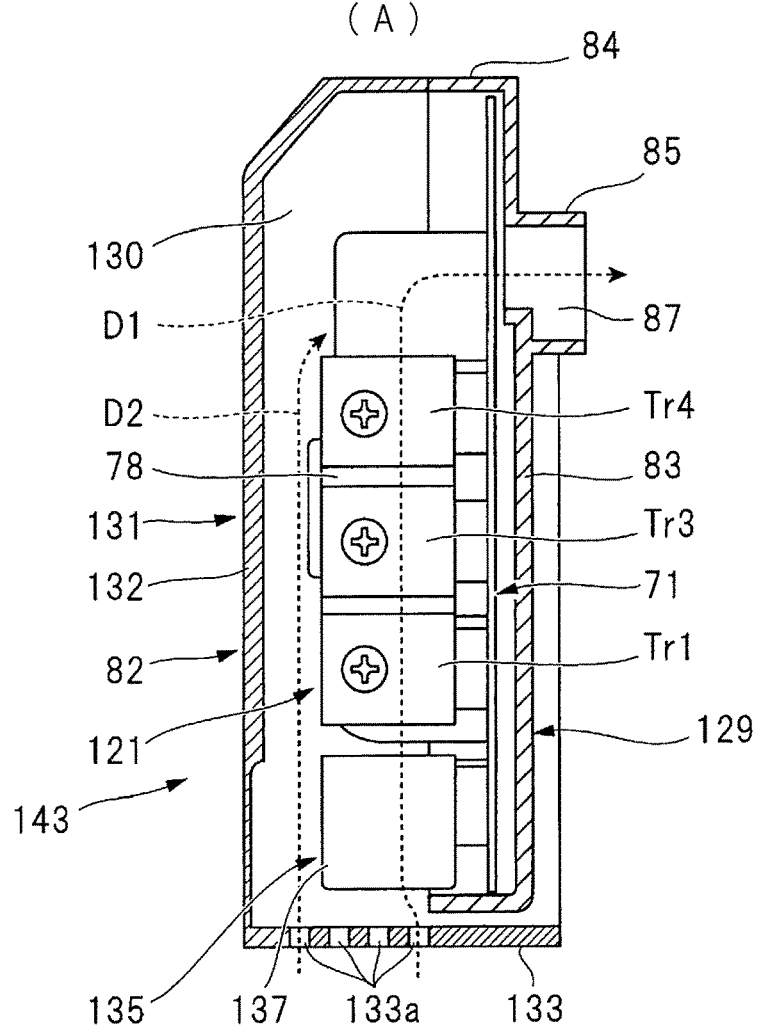
(A)
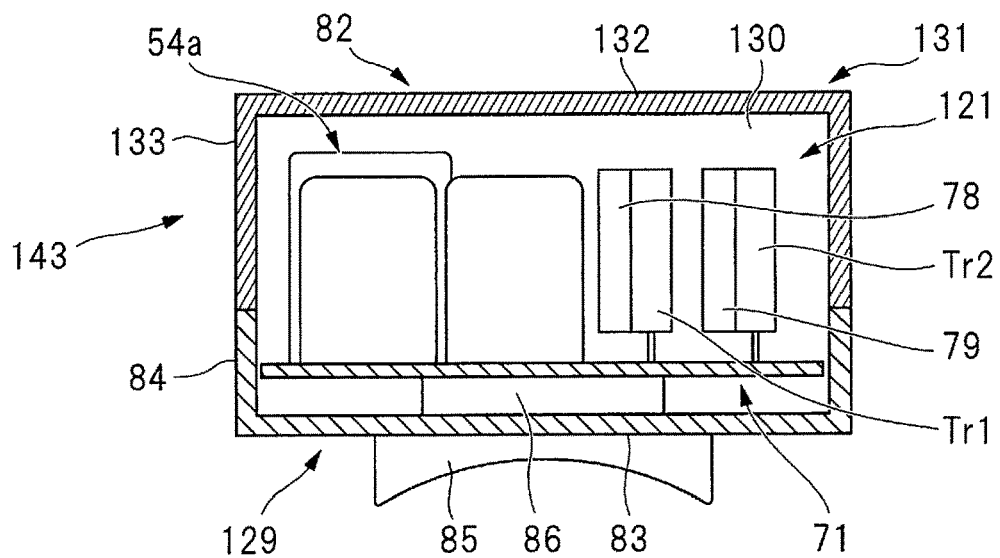
(B)

ELECTRIC WORK MACHINE

CROSS REFERENCE

This application is the U.S. National Phase under 35 U.S.C. § 371 of International Application No. PCT/JP2015/077481, filed on Sep. 29, 2015, which claims the benefit of Japanese Application No. 2014-223404, filed on Oct. 31, 2014, the entire contents of each are hereby incorporated by reference.

TECHNICAL FIELD

The present invention relates to an electric work machine that operates a work tool by power of an electric motor.

BACKGROUND ART

An electric work machine that operates a work tool by power of an electric motor is described in Patent Document 1. The electric work machine described in Patent Document 1 includes a casing that accommodates a brushless motor, a power conversion mechanism that converts rotational force of the brushless motor into rotational force and reciprocating force of the work tool, a fan attached to a rotating shaft of the brushless motor, a switching circuit provided in a circuit from an alternating current power source to a stator of the brushless motor, and a control signal output circuit provided in the casing and which turns ON and OFF a switching element of the switching circuit.

Further, the electric work machine described in Patent Document 1 is provided with an inclination sensor that detects an inclination angle of a housing, a light emitting unit provided in the casing and capable of blinking, and a light emitting speed control unit that changes a blink speed of the light emitting unit according to the inclination angle of the casing.

RELATED ART DOCUMENT

Patent Document
Patent Document 1: Japanese Patent Application Laid-Open Publication No. 2013-94866

SUMMARY OF THE INVENTION

Problems to be Solved by the Invention

However, the electric work machine described in Patent Document 1 has a problem that a temperature of the switching circuit increases when an alternating current voltage is applied to the stator of the brushless motor via the switching circuit.

An object of the present invention is to provide an electric work machine that can suppress temperature increase of a component controlling an electric motor.

Means for Solving the Problems

An electric work machine according to the present invention has an electric motor that operates a work tool, and the electric work machine includes a rectification circuit converting a voltage to be applied to the electric motor from an alternating current voltage to a direct current voltage, and a switching circuit controlling the electric motor, and the rectification circuit is arranged upstream of the switching circuit in a circulation direction of air that cools the rectification circuit and the switching circuit.

Effects of the Invention

According to the present invention, heat of the rectification circuit can be transmitted to the air, and temperature increase of the rectification circuit can be suppressed.

BRIEF DESCRIPTIONS OF THE DRAWINGS

Figure 2:
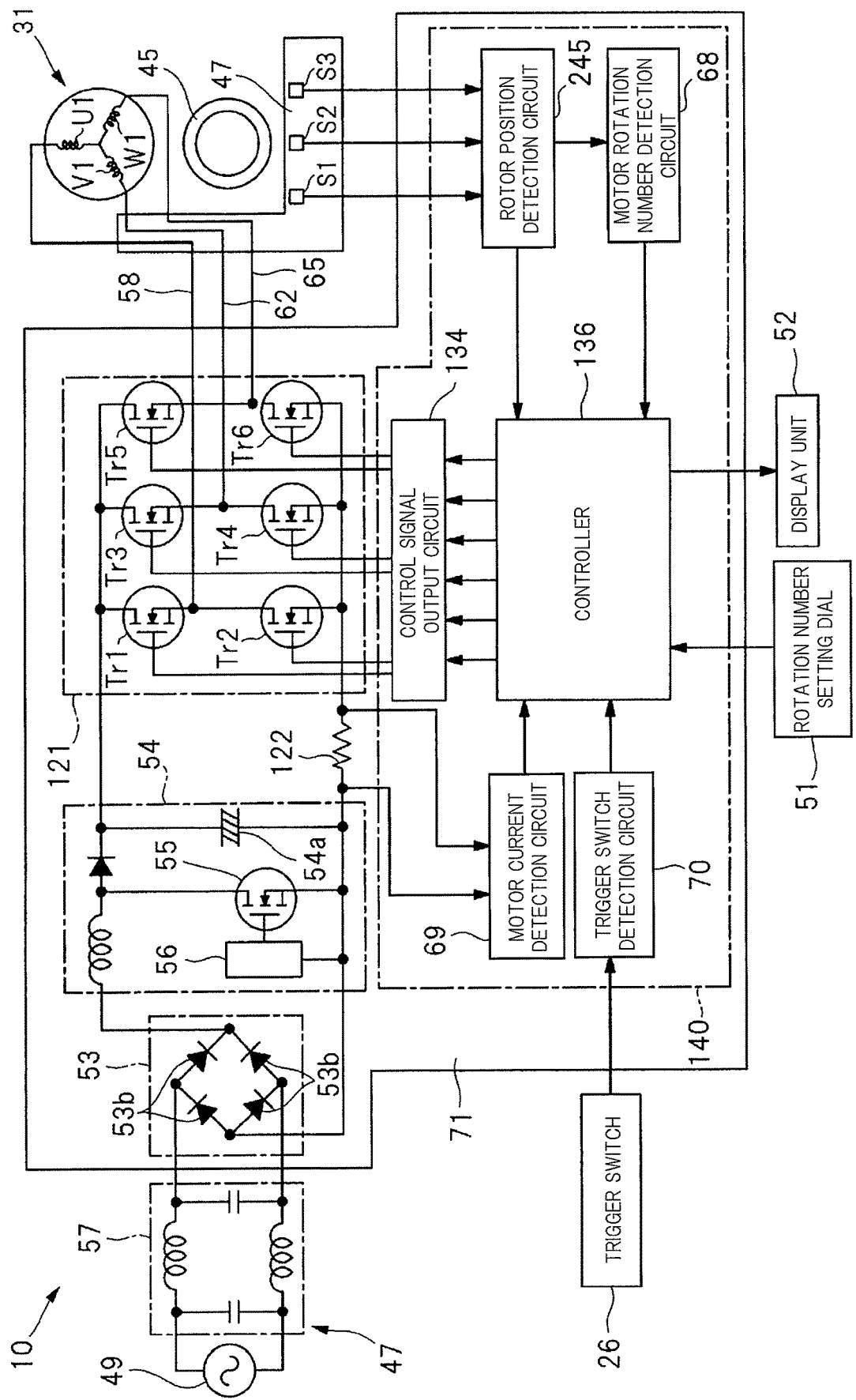
Figure 3:
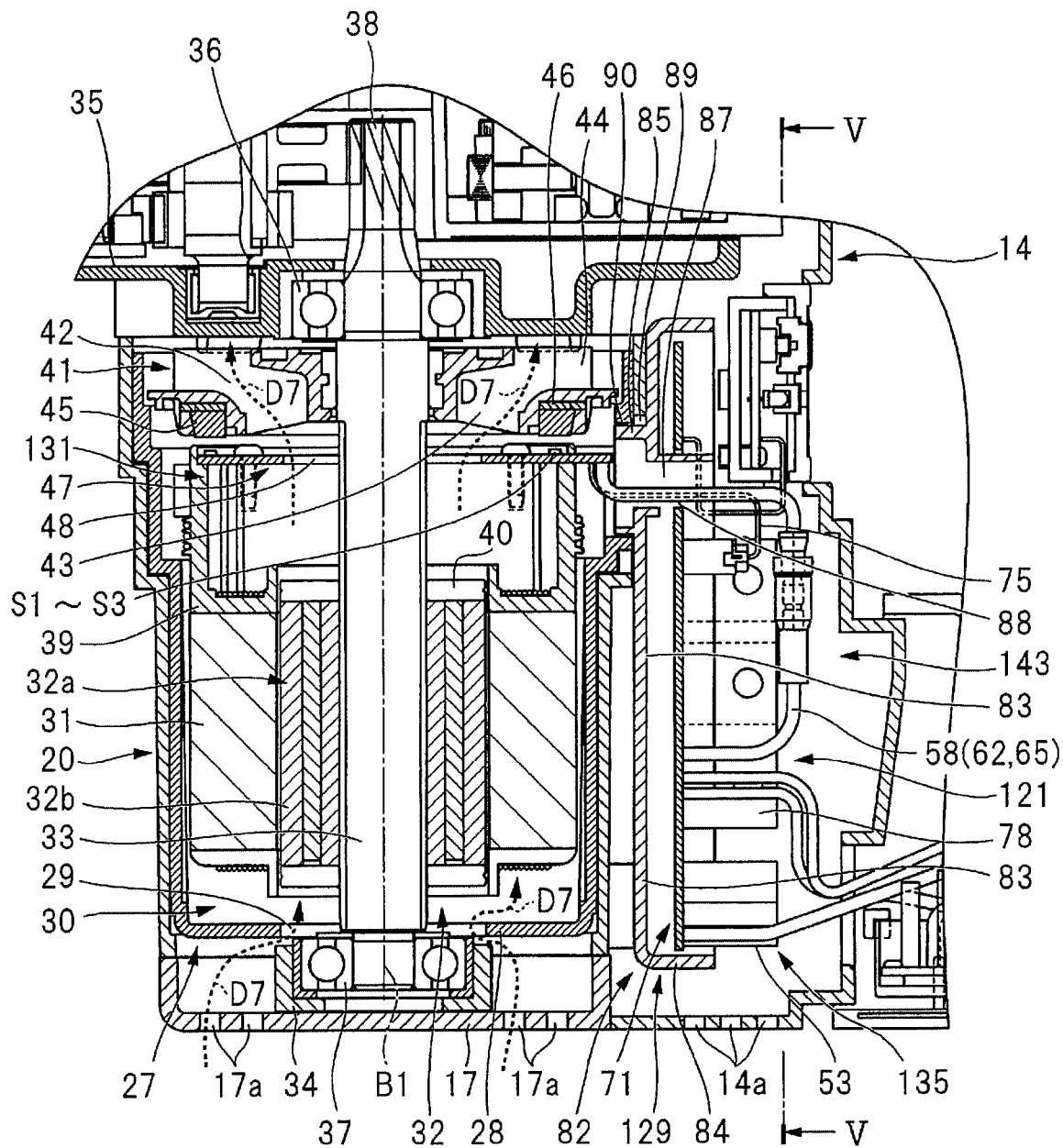
Figure 4:
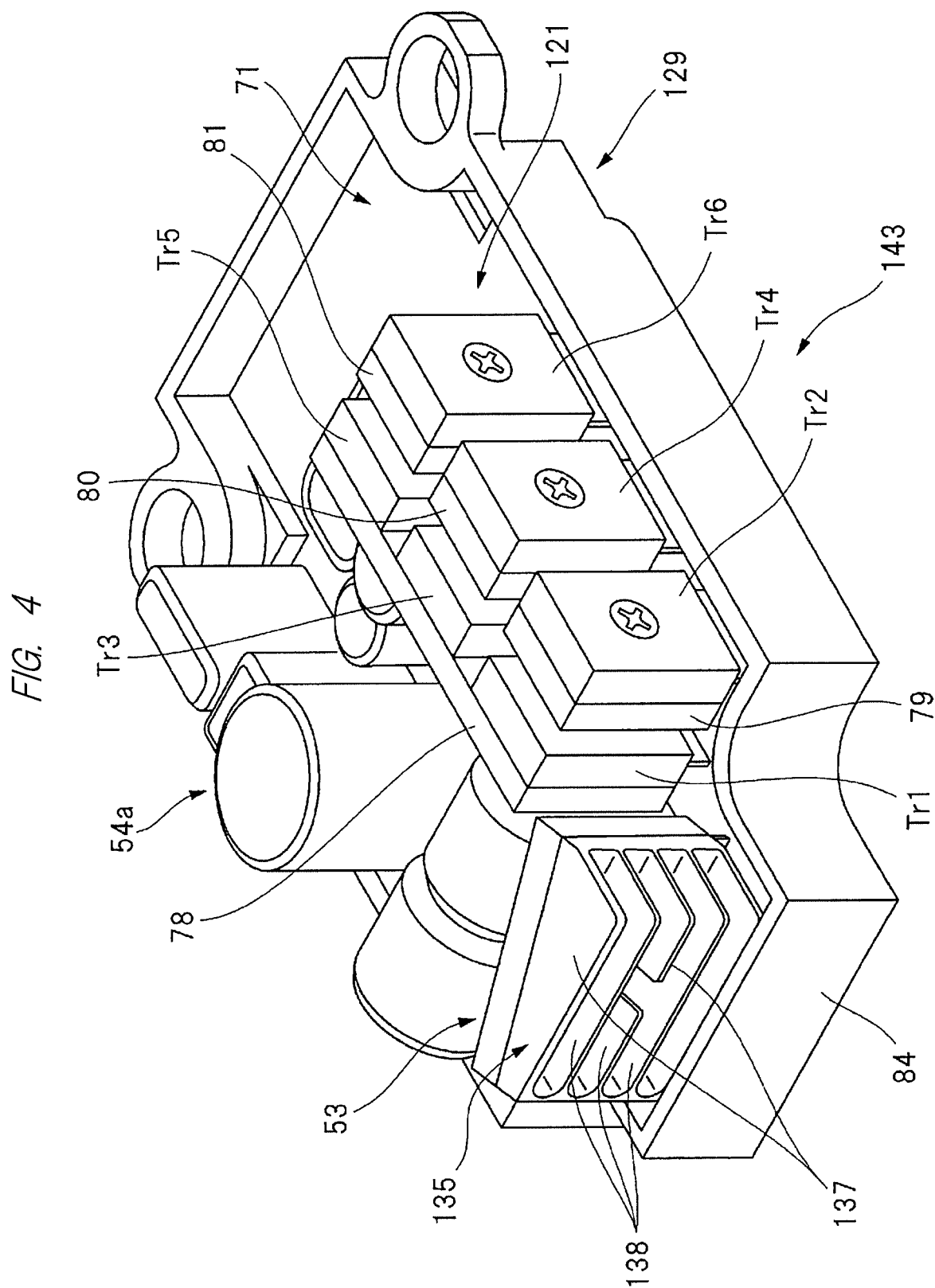
Figure 7:
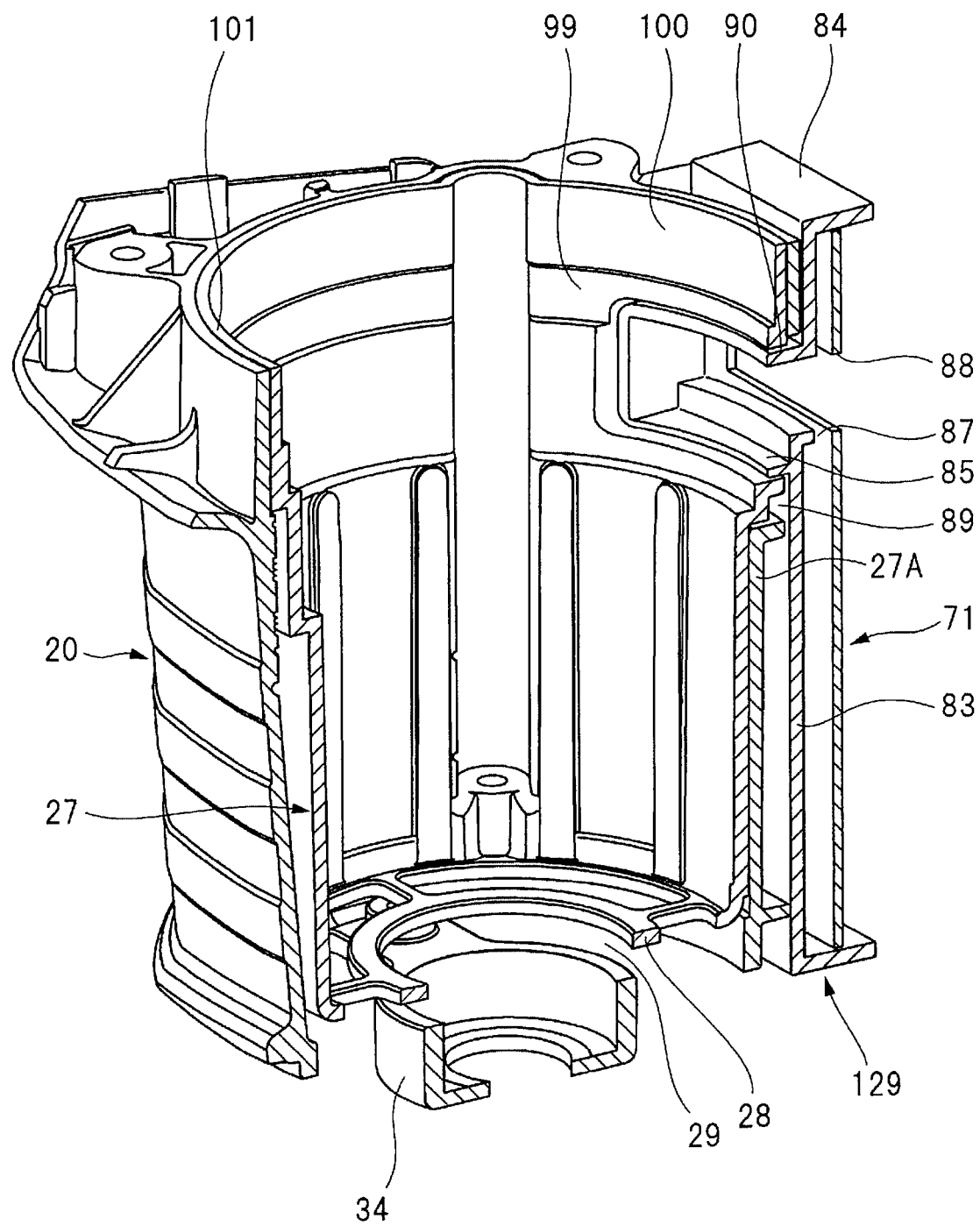
Figure 8:
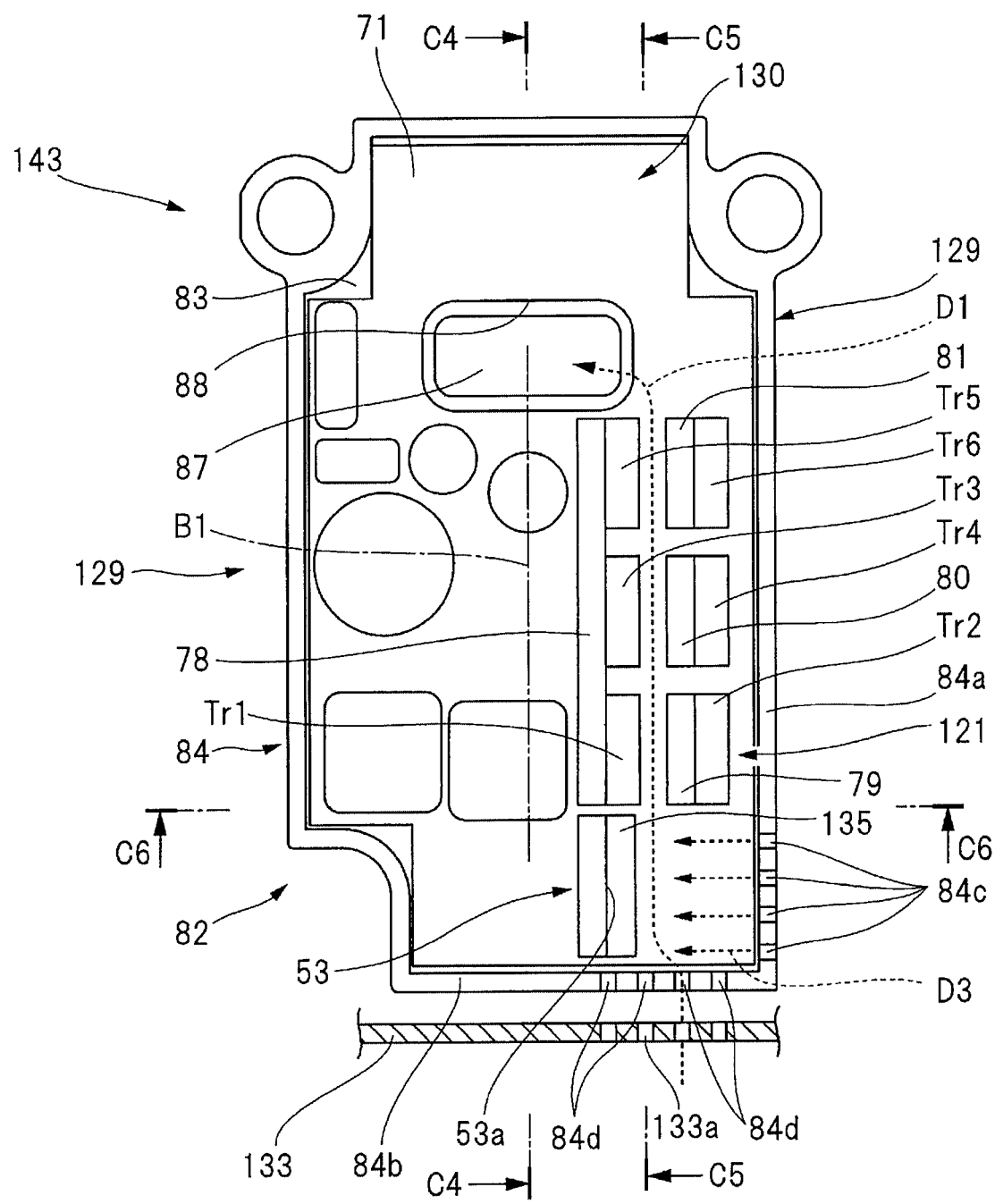
Figure 9:
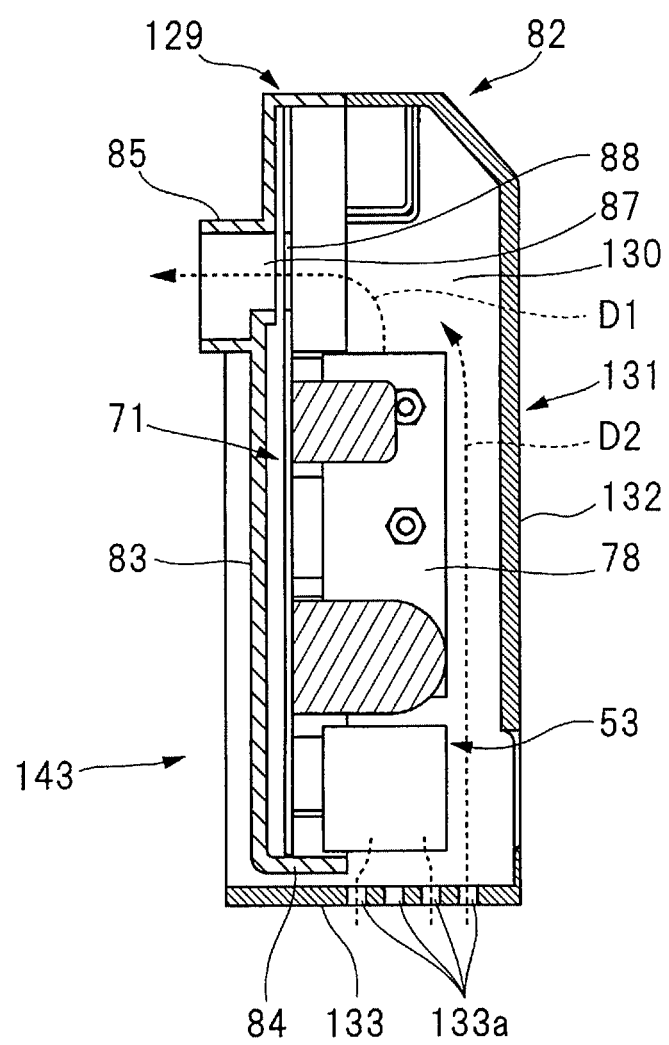
Figure 11:
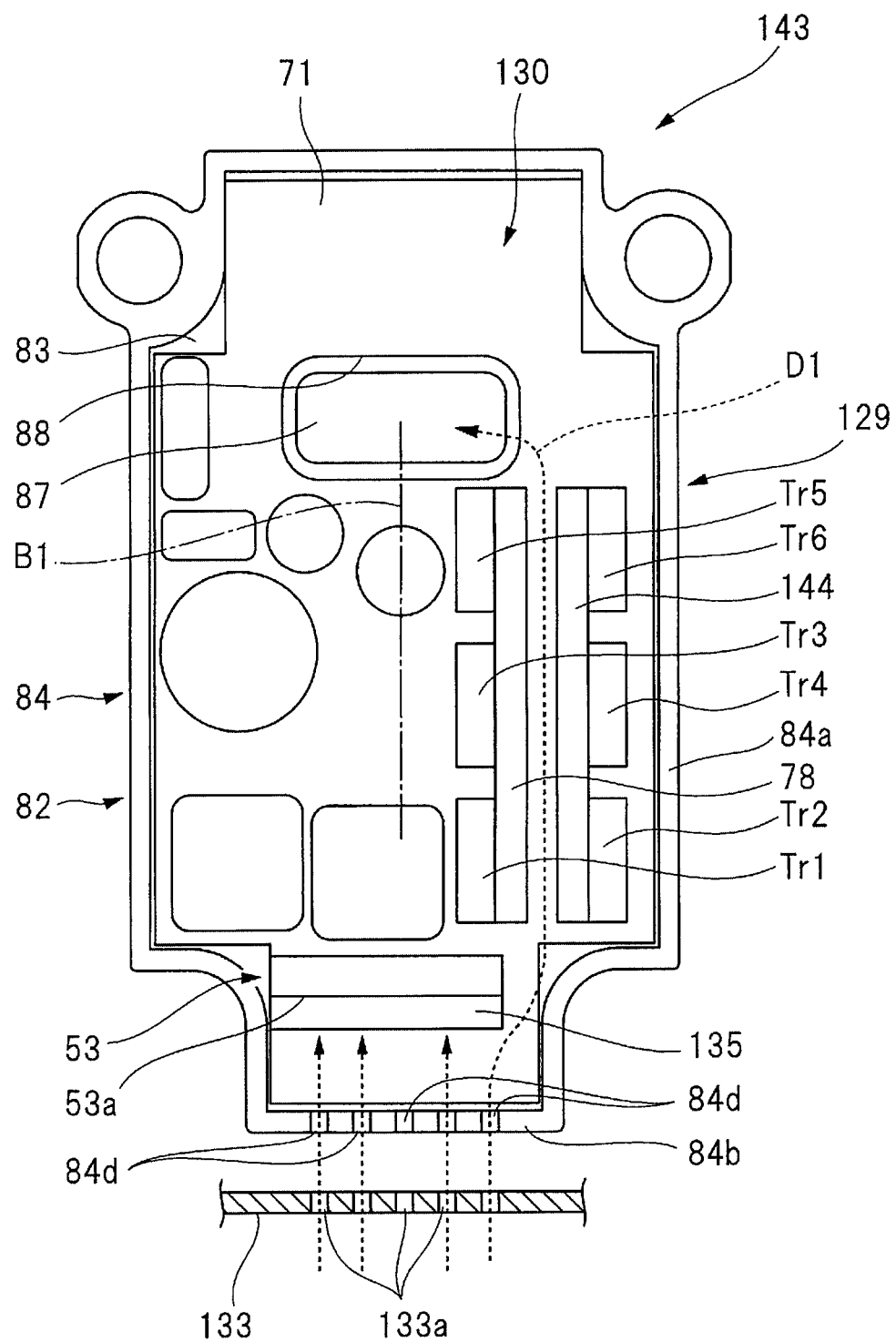
Figure 12:
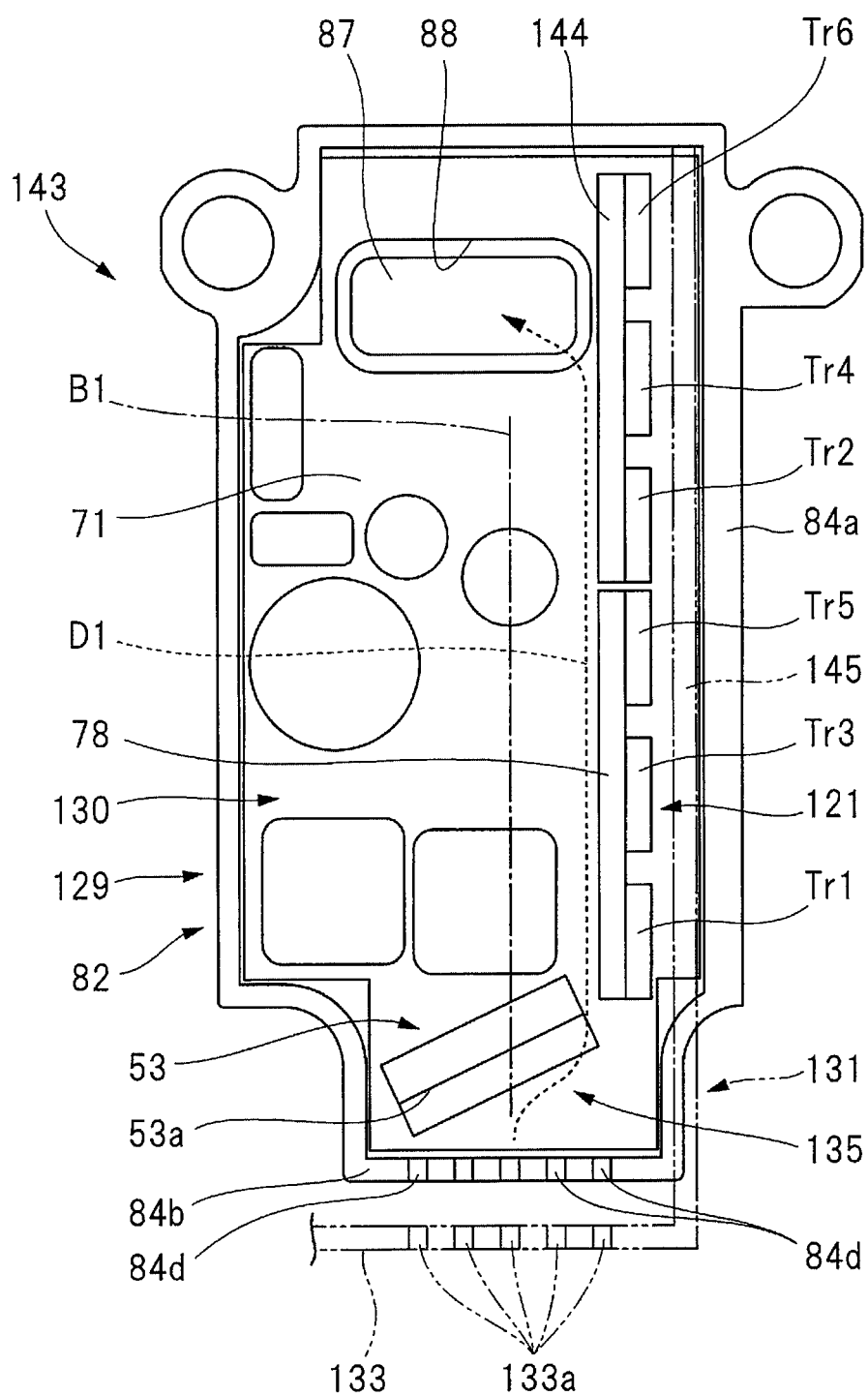
Figure 13:
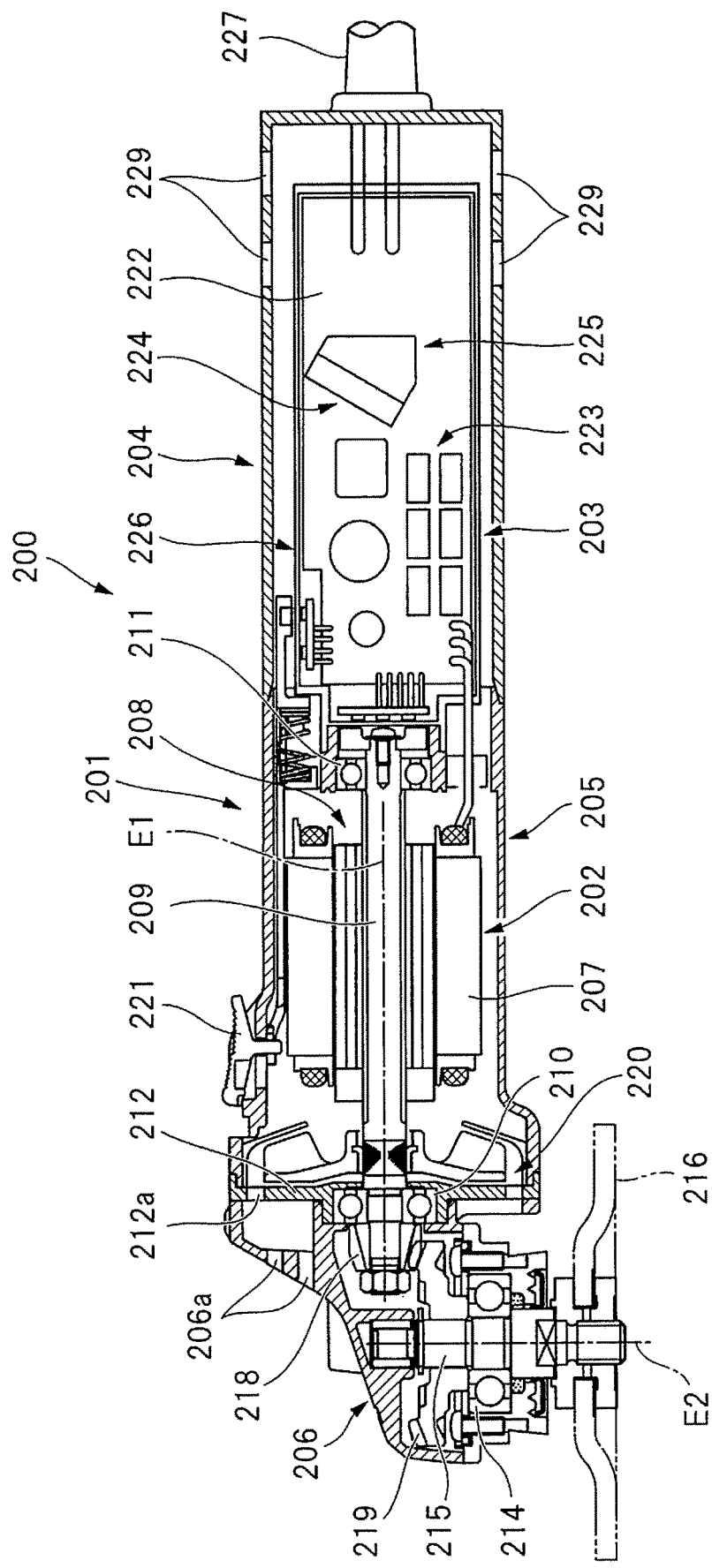
Figure 14:
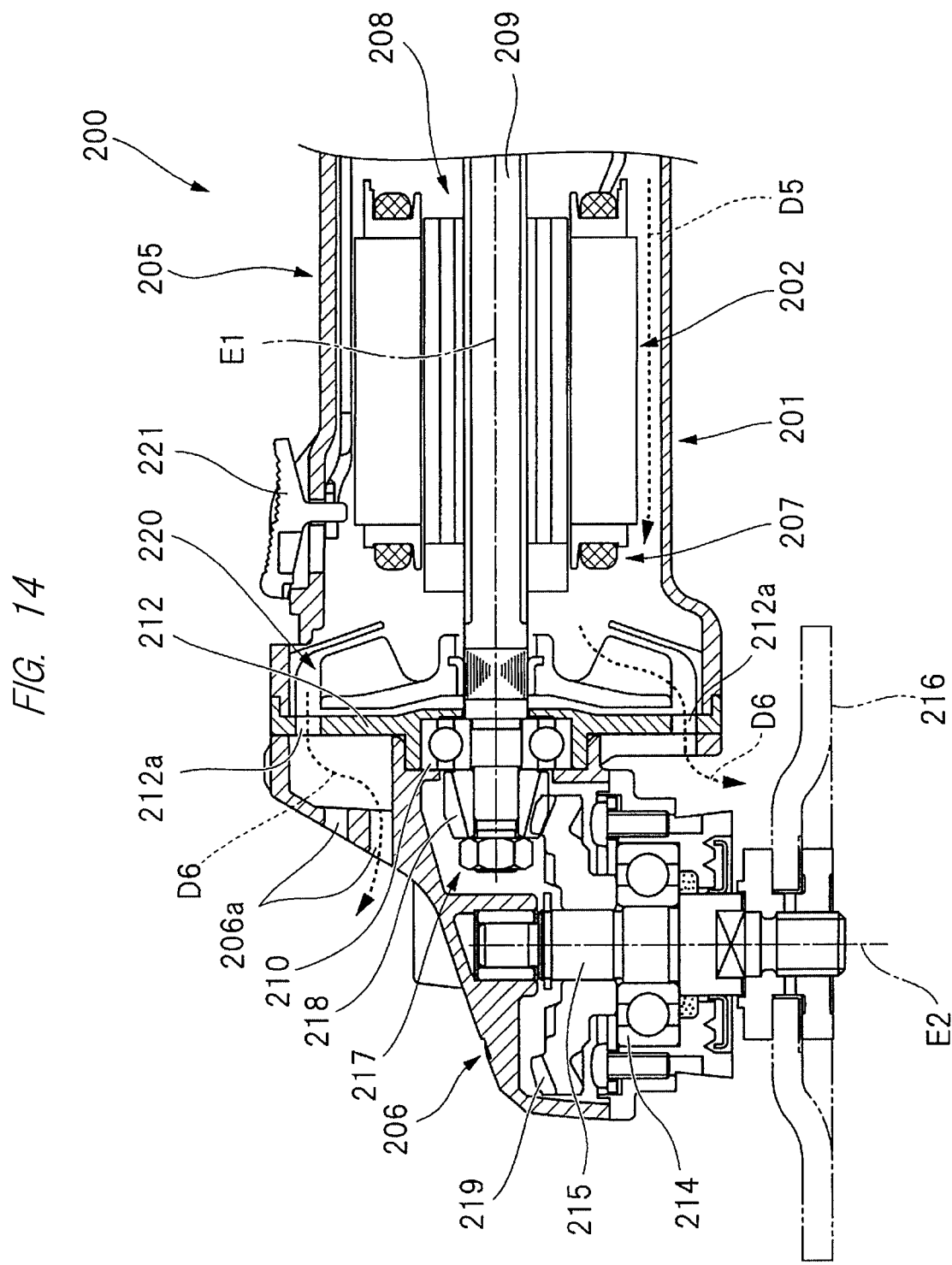
Figure 15:
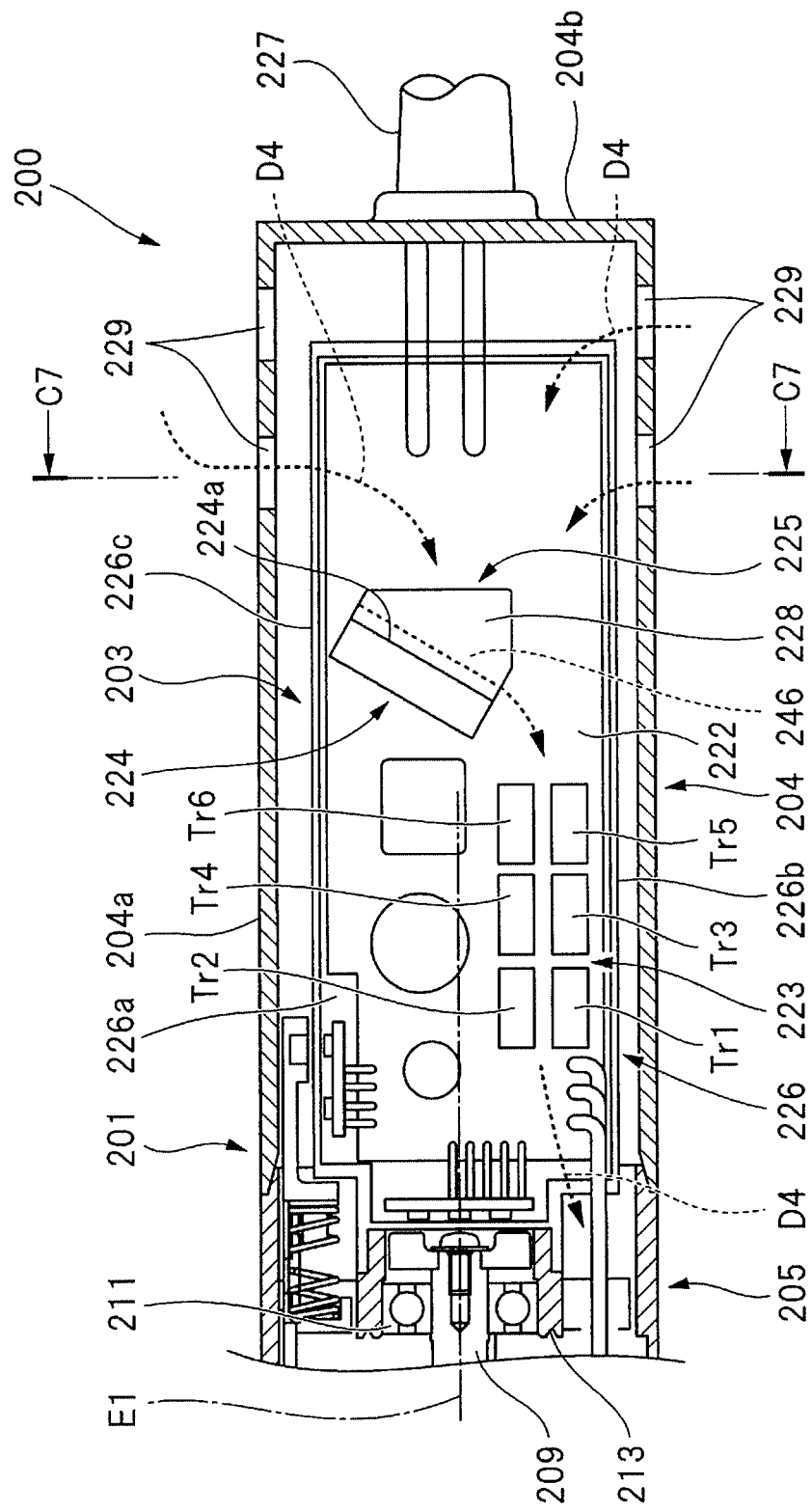
Figure 16:
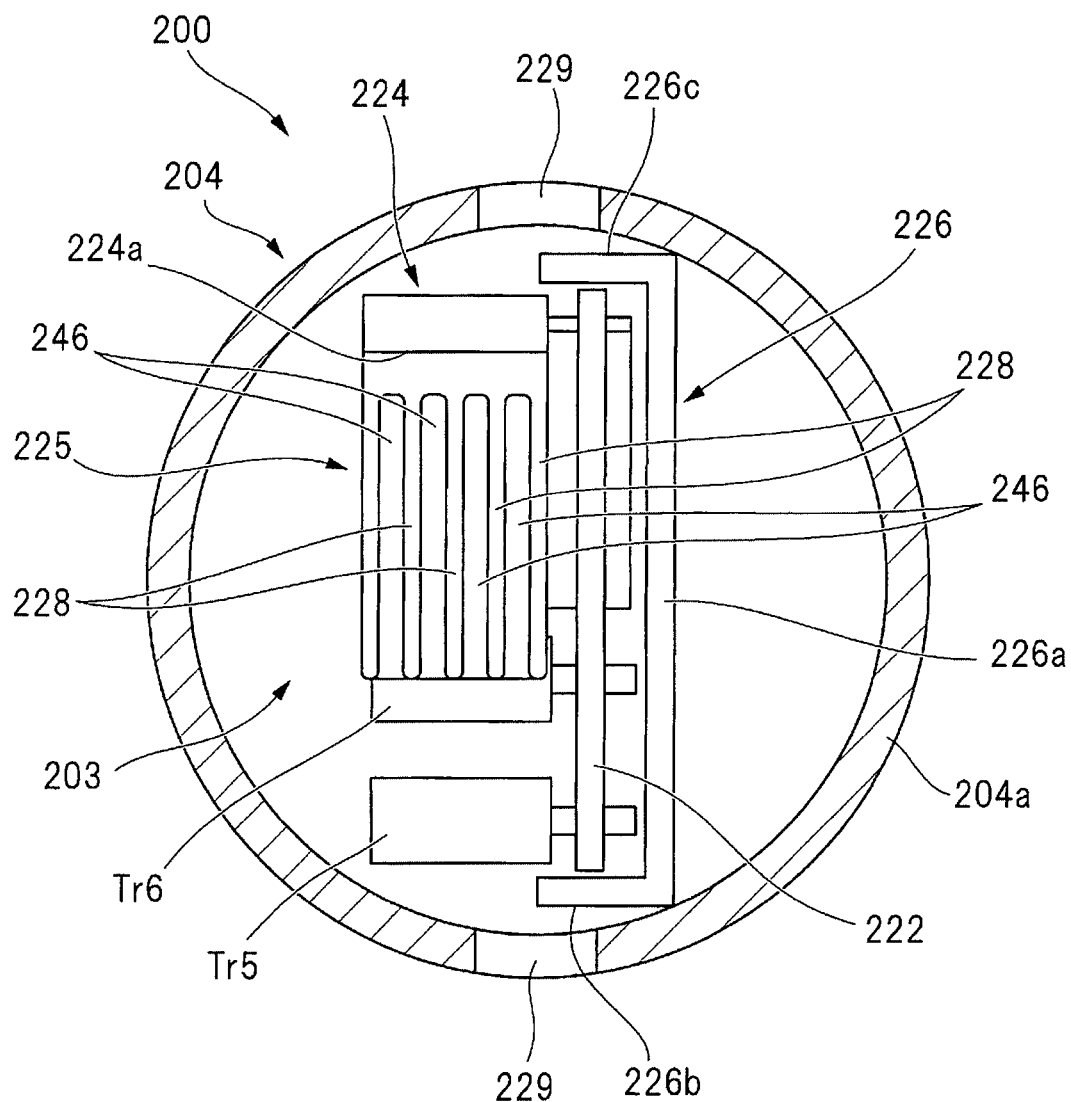

FIG. 1 is a front cross-sectional view illustrating a first embodiment of an electric work machine according to the present invention;
FIG. 2 is a block diagram illustrating a control circuit of the electric work machine of FIG. 1;
FIG. 3 is a front cross-sectional view of an enlarged principal part of the electric work machine of FIG. 1;
FIG. 4 is a perspective view of a substrate unit used for the electric work machine of FIG. 1;
FIG. 5(A) is a side view of the substrate unit taken along a V-V line of FIG. 3;
FIG. 5(B) is a cross-sectional view taken along a C1-C1 line of FIG. 5(A);
FIG. 6(A) is a cross-sectional view taken along a C2-C2 line of FIG. 5(A);
FIG. 6(B) is a cross-sectional view taken along a C3-C3 line of FIG. 5(A);
FIG. 7 is a cross-sectional view of a motor housing and a motor case used for the electric work machine of FIG. 1;
FIG. 8 is a side view illustrating a first modification example of the substrate unit used for the electric work machine of FIG. 1;
FIG. 9 is a cross-sectional view taken along a C4-C4 line of FIG. 8;
FIG. 10(A) is a cross-sectional view taken along a C5-C5 line of FIG. 8;
FIG. 10(B) is a cross-sectional view taken along a C6-C6 line of FIG. 8;
FIG. 11 is a side view illustrating a second modification example of the substrate unit used for the electric work machine of FIG. 1;
FIG. 12 is a side view illustrating a third modification example of the substrate unit used for the electric work machine of FIG. 1;
FIG. 13 is a front cross-sectional view illustrating a second embodiment of the electric work machine according to the present invention;
FIG. 14 is a partial front cross-sectional view of the electric work machine of FIG. 13;
FIG. 15 is a partial front cross-sectional view of the electric work machine of FIG. 13; and
FIG. 16 is a side cross-sectional view taken along a C7-C7 line of FIG. 15.

DETAILED DESCRIPTION OF PREFERRED EMBODIMENTS

Hereinafter, embodiments of the present invention will be described in detail with reference to the drawings.

First Embodiment

A first embodiment of an electric work machine according to the present invention will be described on the basis of FIGS. 1 to 12. An electric work machine 10 according to the first embodiment is also called a hammer drill, and a tip tool 11 is attached/detached thereto/therefrom. The electric work machine 10 is used to drill an object such as concrete or stone material, for example.

The electric work machine 10 includes a work machine main body 12. The work machine main body 12 is assembled such that a cylinder housing 13, an intermediate case 14, a handle 15, a motor housing 20, and a bottom cover 17 are fixed with one another. The cylinder housing 13 has a cylindrical shape, and a cylindrical holding member 128 is provided in the cylinder housing 13. The holding member 128 is fixed to the cylinder housing 13 in an axial line A1 direction and is not rotated with respect to the cylinder housing 13.

A cylindrical cylinder 18 is provided in the holding member 128. The cylinder 18 is arranged centered around the axial line A1. A cylindrical tool holder 19 is provided from an inside to an outside of the holding member 128. The tool holder 19 is concentrically arranged with the cylinder 18, and the tool holder 19 is rotatably supported by a bearing 16. The cylinder 18 and the tool holder 19 are integrally rotatably connected. The tip tool 11 is attached to the tool holder 19, and rotational force of the cylinder 18 is transmitted to the tip tool 11.

An intermediate striker 21 made of metal is provided from an inside of the tool holder 19 to an inside of the cylinder 18. The intermediate striker 21 is freely movable in a reciprocating manner in a direction along the axial line A1. A striker 22 that strikes the intermediate striker 21 is provided in the cylinder 18. The striker 22 is operable in a reciprocating manner in the direction along the axial line A1. Further, a piston 23 is arranged in the cylinder 18 and is operable in a reciprocating manner in the direction along the axial line A1. An air chamber 24 is provided between the striker 22 and the piston 23 in the cylinder 18.

The intermediate case 14 is arranged between the handle 15 and the cylinder housing 13 in the direction along the axial line A1. The motor housing 20 is fixed to the cylinder housing 13 and the intermediate case 14. Both ends of the handle 15 are attached to the intermediate case 14. A trigger 141 and a feed cable 25 are provided to the handle 15. Further, a trigger switch 26 is provided in the handle 15. When an operator operates the trigger 141, the trigger switch 26 is turned ON and OFF.

The motor housing 20 is integrally molded with a conductive metal material, for example, aluminum. The motor housing 20 has a cylindrical shape, and a motor case 27 is arranged inside the motor housing 20. The motor case 27 is integrally molded with an insulating material, for example, a synthetic resin. The motor case 27 includes a cylindrical portion 27A, as illustrated in FIG. 7, and the cylindrical portion 27A of the motor case 27 is press-fit and fixed to the motor housing 20. The motor case 27 includes a bottom 28 continuous to the cylindrical portion 27A, and a shaft hole 29 is formed in the bottom 28.

Further, a brushless motor 30 is accommodated in the motor case 27. The brushless motor 30 is a direct current electric motor and includes a cylindrical stator 31 and a rotor 32 arranged inside the stator 31. The rotor 32 includes an output shaft 33 and a rotor core 32a fixed to the output shaft 33. An axial line B1 that is a rotation center of the output shaft 33 is at a right angle to the axial line A1 in front view of the electric work machine 10.

The motor housing 20 is arranged between the bottom cover 17 and the cylinder housing 13 in a direction along the axial line B1. The motor housing 20 includes a bearing support portion 34 positioned in the bottom cover 17. Further, a partition wall 35 is provided from an inside of the intermediate case 14 to an inside of the cylinder housing 13. Further, a bearing 36 supported by the partition wall 35 and a bearing 37 supported by the bearing support portion 34 are provided. The two bearings 36 and 37 are arranged in different positions in the direction along the axial line B1 of the output shaft 33. A first end portion of the output shaft 33 is arranged in the shaft hole 29, and a second end portion of the output shaft 33 is arranged in the intermediate case 14. A drive gear 38 is provided to an outer peripheral surface of a portion of the output shaft 33 which is arranged in the intermediate case 14.

An insulator 39 is provided in the motor case 27. The insulator 39 is arranged between the brushless motor 30 and the bearing 36 in the direction along the axial line B1. As illustrated in FIG. 3, the insulator 39 includes a shaft hole 40, and the output shaft 33 is arranged in the shaft hole 40. The insulator 39 is made of a synthetic resin and is provided in the motor case 27 in a non-rotatable manner. The insulator 39 is fixed to the stator 31.

A cooling fan 41 is provided between the insulator 39 and the bearing 36 in the motor case 27. The cooling fan 41 is fixed to the output shaft 33, and the cooling fan 41 is rotated together with the output shaft 33 to serve a function to introduce air outside the work machine main body 12 into the work machine main body 12. Therefore, a suction port 17a is formed in the bottom cover 17. Further, a suction port 14a is formed in a portion in the intermediate case 14 which extends in the same direction as the bottom cover 17. An outside of the work machine main body 12 and an inside of the motor case 27 are communicated with each other by the shaft hole 29 and the suction port 17a. The outside of the work machine main body 12 and the inside of the intermediate case 14 are communicated with each other by a suction port 14a.

A structure of the cooling fan 41 that cools the brushless motor 30 will be described with reference to FIG. 3. The cooling fan 41 has an annular shape, and the cooling fan 41 is attached to the output shaft 33. That is, the cooling fan 41 is rotated together with the output shaft 33. The cooling fan 41 is a centrifugal fan that transports the air from an inside to an outside in a radial direction of the axial line B1 and includes a plurality of blades arranged at intervals in a circumferential direction. A passage 42 of the air is formed between the blades. The passage 42 is arranged from the inside to the outside in the radial direction centered around the axial line B1. An intake port 43 is arranged inside in the radial direction, and a discharge port 44 is arranged outside in the radial direction. The discharge port 44 communicates with the inside of the intermediate case 14 and the inside of the cylinder housing 13.

As illustrated in FIG. 1, an exhaust port 146 is provided between the partition wall 35 and the cooling fan 41 in the cylinder housing 13. Through the exhaust port 146, the inside of the cylinder housing 13 and the outside of the work machine main body 12 are communicated with each other. The cooling fan 41 is molded with a synthetic resin as a nonmagnetic material, and a permanent magnet 45 is attached to the cooling fan 41. The permanent magnet 45 is an annular body centered around the axial line B1, and N poles and S poles which are different magnetic poles are alternately arranged along the circumferential direction of the permanent magnet 45.

A connection substrate 47 is provided in the motor case 27. The connection substrate 47 is fixed to the insulator 39, for example. That is, the connection substrate 47 is attached to the stator 31 via the insulator 39. The connection substrate 47 is arranged between the stator 31 and the permanent magnet 45 attached to the cooling fan 41 in the direction along the axial line B1. A hole 48 that penetrates the connection substrate 47 in a thickness direction is provided, and the output shaft 33 is arranged in the hole 48. The connection substrate 47 is molded with a nonmagnetic material, for example, a synthetic resin, and magnetic sensors S1 to S3 are attached to the connection substrate 47.

Next, a mechanism to convert the rotational force of the output shaft 33 into rotational force of the cylinder 18 will be described. A rotational force transmission shaft 110 is freely rotatably provided in the cylinder housing 13, and a driven gear 111 is provided in the rotational force transmission shaft 110. The driven gear 111 is meshed with a drive gear 112 of a crank shaft 106. The rotational force transmission shaft 110 is rotatably supported by bearings 113 and 114. Therefore, the rotational force of the output shaft 33 is transmitted to the rotational force transmission shaft 110 through the crank shaft 106. Further, a bevel gear 115 is provided in the rotational force transmission shaft 110.

Meanwhile, a cylindrical bevel gear 116 is attached to an outer periphery of the cylinder 18, and the bevel gear 116 is rotatable with respect to the cylinder 18. The bevel gear 116 is meshed with the bevel gear 115. A sleeve 117 is attached to the outer periphery of the cylinder 18 such that the sleeve is integrally rotated with the cylinder 18 and movable in the direction along the axial line A1. The electric work machine 10 includes a mode switch dial 123. When the operator operates the mode switch dial 123, the sleeve 117 is moved in the direction along the axial line A1. Further, a clutch mechanism that engages and releases the sleeve 117 and the bevel gear 116 is provided.

When the sleeve 117 is moved along the axial line A1 with respect to the cylinder 18, the sleeve 117 is engaged with the bevel gear 116 in a power transmittable manner, or the sleeve 117 is released from the bevel gear 116. When the sleeve 117 is engaged with the bevel gear 116, the rotational force of the rotational force transmission shaft 110 is transmitted to the cylinder 18. In contrast, when the sleeve 117 is released from the bevel gear 116, the rotational force of the rotational force transmission shaft 110 is not transmitted to the cylinder 18.

A vibration damping mechanism 124 is provided between a power conversion mechanism 120 and the handle 15 in the direction along the axial line A1 in the intermediate case 14. The vibration damping mechanism 124 includes a weight 126, and the weight 126 swings, having the spindle 125 as a fulcrum. The weight 126 swings along a plane direction including the axial lines A1 and B1 within a range of a predetermined angle. An arrangement region of the vibration damping mechanism 124 overlaps with an arrangement region of the brushless motor 30 and an arrangement region of a control substrate 71 in the direction along the axial line A1.

FIG. 2 is a block diagram illustrating a control circuit that controls the electric work machine 10. A current of an alternating current power source 49 flows to a coil of the brushless motor 30 through the feed cable 25. The electric work machine 10 includes a rotation number setting dial 51 for setting a target rotation number of the brushless motor 30. When the operator operates the rotation number setting dial 51, the target rotation number of the brushless motor 30 is switchable in a stepwise manner. The electric work machine 10 includes a display unit 52 that displays the target rotation number of the brushless motor 30.

Further, the stator 31 of the brushless motor 30 includes coils U1, V1, and W1 corresponding to a U phase, a V phase, and a W phase, four permanent magnets 32$b$ of two types having different polarities are provided in the rotor core 32$a$ at intervals in the circumferential direction, and the permanent magnets 32$b$ having different polarities are alternately arranged. The three magnetic sensors S1 to S3 output detection signals indicating a rotation position of the rotor 32. The three magnetic sensors S1 to S3 are provided corresponding to the coils U1, V1, and W1 of three phases, respectively. Each of the magnetic sensors S1 to S3 is a non-contact sensor that detects magnetic force generated by the permanent magnet 45 attached to the cooling fan 41 and converts the magnetic force into an electric signal and outputs the signal. As the magnetic sensors S1 to S3, a hall element can be used. The magnetic sensors S1 to S3 are attached to the connection substrate 47.

The electric work machine 10 includes a switching circuit 121 that controls currents to be supplied to the coils U1, V1, and W1. A rectification circuit 53 for rectifying an alternating current of the alternating current power source 49 into a direct current and a power factor correction circuit 54 for boosting and supplying a voltage of the rectified direct current to the switching circuit 121 are provided in an electrical circuit between the alternating current power source 49 and the switching circuit 121. The rectification circuit 53 is a bridge circuit in which four diode elements 53$b$ are connected with one another, for example. The power factor correction circuit 54 includes an integrated circuit 56 that outputs a pulse width modulation (PWM) control signal to a transistor 55 constituted by a field effect transistor and suppresses a harmonic current generated in a switching element of the switching circuit 121 to a limited value or less. Further, the power factor correction circuit 54 includes a capacitor 54$a$. Note that a noise countermeasure circuit 57 is provided between the alternating current power source 49 and the rectification circuit 53 in order not to transmit noises generated in the switching circuit 121 to the alternating current power source 49.

The switching circuit 121 is a three-phase full bridge inverter circuit and includes two switching elements Tr1 and Tr2 connected with each other, two switching elements Tr3 and Tr4 connected with each other, and two switching elements Tr5 and Tr6 connected with each other. The switching elements Tr1 to Tr6 are insulated gate bipolar transistors (IGBTs). The switching elements Tr1 and Tr2 are connected in parallel to each other and are connected to the coil U1 through a lead wire 58. The switching elements Tr3 and Tr4 are connected in parallel to each other and are connected to the coil V1 through a lead wire 62. The switching elements Tr5 and Tr6 are connected in parallel to each other and are connected to the coil W1 through a lead wire 65.

The switching elements Tr1, Tr3, and Tr5 are connected to an output terminal of a positive electrode of the power factor correction circuit 54. The switching elements Tr2, Tr4, and Tr6 are connected to a negative electrode terminal of the power factor correction circuit 54 through a current detection resistor 122.

As described above, the three switching elements Tr1, Tr3, and Tr5 connected to the positive electrode side of the power factor correction circuit 54 are on a high side, and the three switching elements Tr2, Tr4, and Tr6 connected to the negative electrode side of the power factor correction circuit 54 are on a low side. The coils U1, V1, and W1 are connected with one another and are star-connected.

Note that the connection method of the coils U1, V1, and W1 may be delta connection. For example, when a control signal is conducted to gates of the high-side switching element Tr1 and the low-side switching element Tr4, the current is supplied to each of the coils U1 and V1 of the U phase and the V phase. By controlling timing to turn ON and OFF and a period to turn ON the respective switching elements Tr1 to Tr6, commutation operation to each of the coils U1, V1, and W1 is controlled.

A motor control unit 140 calculates and outputs a signal controlling the switching circuit 121. The motor control unit 140 includes a controller 136, a control signal output circuit 134, a rotor position detection circuit 245, a motor rotation number detection circuit 68, a motor current detection circuit 69, and a trigger switch detection circuit 70. Detection signals of the magnetic sensors S1 to S3 are sent to the rotor position detection circuit 245. The rotor position detection circuit 245 detects a rotation position of the rotor 32. The rotation position of the rotor 32 is a phase of the rotor 32 in a rotating direction and is positional relation or an angle of a predetermined reference position of a fixed element such as the stator 31 in the rotating direction and a reference position of the rotor 32 determined in the rotating direction.

The rotor position detection circuit 245 processes a signal that indicates the rotation position of the rotor 32. The signal output from the rotor position detection circuit 245 is sent to the controller 136 and the motor rotation number detection circuit 68. The motor rotation number detection circuit 68 detects the rotation number of the motor, and a signal output from the motor rotation number detection circuit 68 is input to the controller 136.

The motor current detection circuit 69 is connected to both ends of the current detection resistor 122 and detects a current flowing in the brushless motor 30. A signal output from the motor current detection circuit 69 is input to the controller 136. The controller 136 includes a microprocessor that processes the control signal, and a memory. A control program, an operation expression, data, and the like are stored in the memory. The controller 136 processes the signal input from the motor rotation number detection circuit 68 to calculate an actual rotation number of the rotor 32. A signal output from the controller 136 is input to the control signal output circuit 134, and the switching circuit 121 is controlled by a signal input from the control signal output circuit 134.

The control substrate 71 is arranged outside the motor housing 20 and inside the intermediate case 14. The control substrate 71 is arranged outside the motor housing 20 in the radial direction centered around the axial line B1. The control substrate 71 is arranged between the motor housing 20 and the handle 15 in the direction along the axial line A1. A thickness direction of the control substrate 71 is the same as the radial direction centered around the axial line B.

The control substrate 71 is integrally molded with an insulating material, for example, a synthetic resin. An arrangement range of the control substrate 71 in the direction along the axial line B1 overlaps an arrangement range of the motor housing 20 in the direction along the axial line B1.

Figure 5:
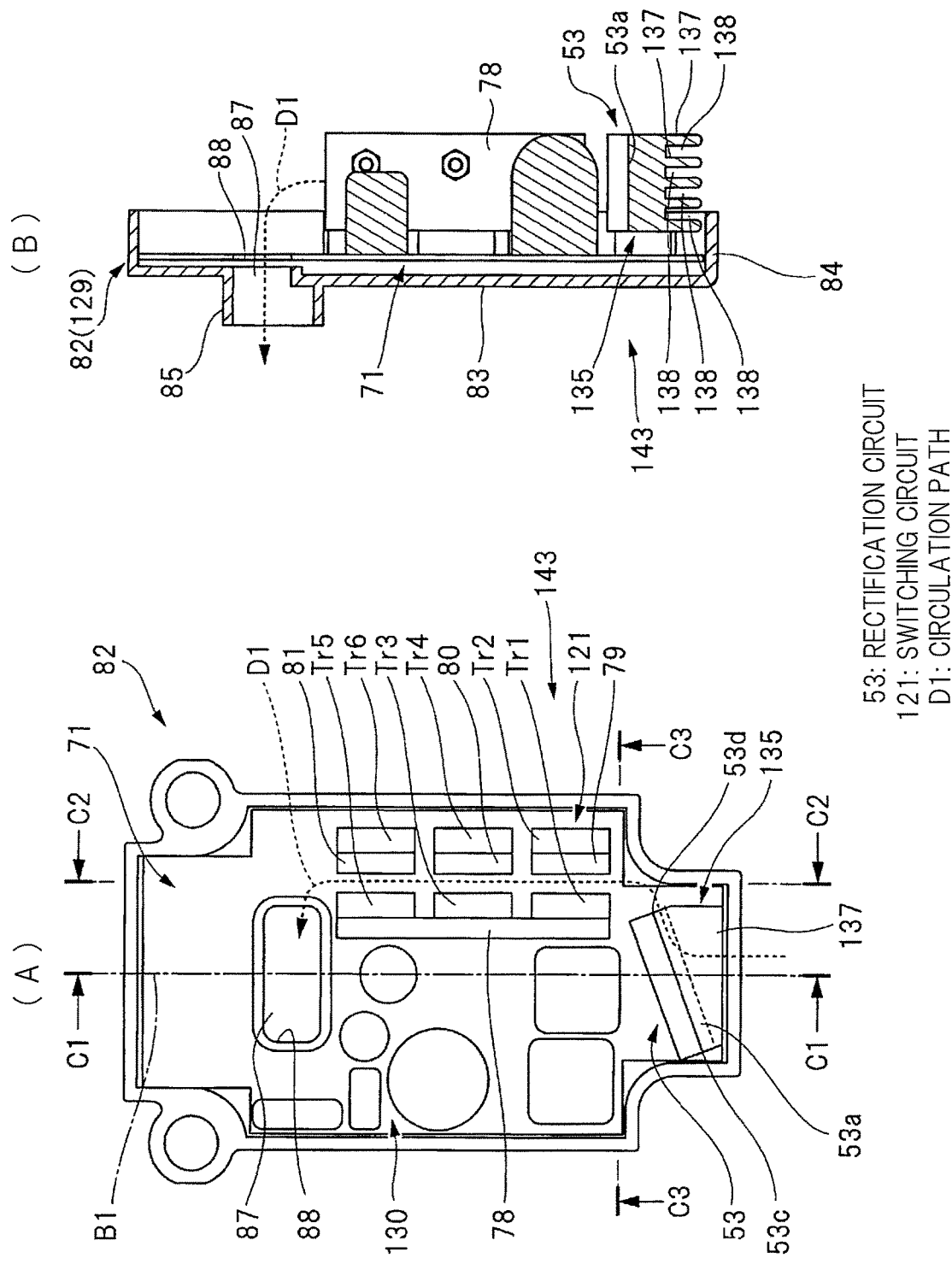

As illustrated in FIGS. 4 and 5, the three switching elements Tr1 to Tr6 are attached to the control substrate 71, and a heat sink 78 in contact with the three switching elements Tr1, Tr3, and Try is provided. Further, a heat sink 79 in contact with the switching element Tr2, a heat sink 80 in contact with the switching element Tr4, and a heat sink 81 in contact with the switching element Tr6 are provided. The heat sinks 78 to 81 are molded with a metal having heat conductivity, and for example, aluminum or copper. The heat sinks 78 to 81 transmit heat of the switching elements Tr1 to Tr6 to the air, thereby cooling the switching elements Tr1 to Tr6. The heat sink 78 is attached to surfaces of the switching elements Tr1, Tr3, and Tr5, the surfaces being positioned opposite to the switching elements Tr2, Tr4, and Tr6.

As illustrated in FIG. 3, the rectification circuit 53 attached to the control substrate 71 is arranged between the heat sink 78 and the suction port 14a in the direction along the axial line B1. As illustrated in FIG. 5(A), an arrangement region of the rectification circuit 53 overlaps with the axial line B1 in side view of the control substrate 71. Further, arrangement regions of the switching elements Tr1 to Tr6 do not overlap with the axial line B1. Then, a surface 53a of the rectification circuit 53 is flat and is inclined with respect to the axial line B1. The surface 53a is inclined in a direction approaching the switching element Tr1. Further, a substrate case 82 is provided outside the motor housing 20, that is, inside the intermediate case 14. The substrate case 82 is constituted by a main body portion 129, and an accommodating chamber 130 illustrated in FIG. 5(B) and FIGS. 6(A) and 6(B) is formed between the main body portion 129 and an inner surface of the intermediate case 14. The main body portion 129 is provided with the control substrate 71, the switching elements Tr1 to Tr6, the heat sinks 78 to 81, the rectification circuit 53, the power factor correction circuit 54, and the motor control unit 140.

The main body portion 129 is molded with an insulating material, for example, a synthetic resin. The main body portion 129 has a tray shape including a bottom 83 and a side wall 84 provided along an outer periphery of the bottom 83.

A cylindrical portion 85 continuous to the bottom 83 is provided. The cylindrical portion 85 protrudes from the bottom 83 toward the motor housing 20. Then, as illustrated in FIGS. 5(B) and 7, a passage 87 is provided in the cylindrical portion 85. As illustrated in FIG. 5(A), a hole portion 88 that penetrates the control substrate 71 in a thickness direction communicates with the passage 87.

A hole portion 89 that penetrates the motor housing 20 is provided, and a hole portion 90 that penetrates the cylindrical portion 27A of the motor case 27 is provided. Arrangement positions of the two hole portions 89 and 90 overlap with each other in the direction along the axial line B1, and arrangement positions in the circumferential direction centered around the axial line B1 overlap with each other. Then, the cylindrical portion 85 is arranged in the two hole portions 89 and 90. Therefore, through the passage 87, the inside of the motor case 27 and the accommodating chamber 130 are communicated with each other.

Positional relations among the components in the accommodating chamber 130 will be described. The rectification circuit 53 and the switching circuit 121 are arranged between the suction port 14a and the passage 87 in the direction along the axial line B1. Further, as illustrated in FIG. 5(B), a circulation path D1 that passes the suction port 14a, the accommodating chamber 130, and the passage 87 is formed. The circulation path D1 schematically illustrates a path in which the air flows.

The suction port 14a is positioned upstream of the passage 87 in a circulation direction of the air in the circulation path D1. Further, a distance in a straight line from the rectification circuit 53 to the suction port 14a, of the components accommodated in the accommodating chamber 130, is shorter than respective distances in a straight line from the components other than the rectification circuit 53 to the suction port 14a. That is, the rectification circuit 53 is arranged upstream of the switching elements Tr1 to Tr6 in the flow direction of the air in the circulation path D1.

Further, as illustrated in FIG. 5(A), the axial line B1 passes the arrangement regions of, the passage 87 and the rectification circuit 53 in right side view of the control substrate 71 but is off the arrangement regions of the switching elements Tr1 to Tr6. In the circulation path D1, the direction of the flow of the air between the switching elements Tr1, Tr3, and Tr5, and the switching elements Tr2, Tr4, and Tr6 is a direction along the axial line B1. In contrast, the surface 53a of the rectification circuit 53 is inclined with respect to the axial line B1. The surface 53a is inclined with respect to the axial line B1 in a direction in which a distance from an end portion 53d closer to the switching elements Tr1 to Tr6, of end portions 53c and 53d of the surface 53a in the axial line A1 direction, to the suction port 14a becomes longer than a distance from the end portion 53c farther from the switching elements Tr1 to Tr6 to the suction port 14a. The distances are distances in a straight line in the direction along the axial line B1.

Further, a heat sink 135 is attached to the surface 53a of the rectification circuit 53. The heat sink 135 is formed of a metal having heat conductivity, for example, aluminum or copper. The heat sink 135 is in contact with the surface 53a of the rectification circuit 53 and is provided with a plurality of fins 137. The plurality of fins 137 extend in the direction along the axial line B1. The plurality of fins 137 are arranged in parallel at intervals. Grooves 138 are formed between the plurality of fins 137. A bottom of the groove 138 is parallel to the surface 53a in side view of the control substrate 71. The various components, for example, the rectification circuit 53, the switching circuit 121, the control substrate 71, and the heat sink 135 are arranged in the accommodating chamber 130 of the substrate case 82 and constitute a substrate unit 143.

The power conversion mechanism 120 that converts the rotational force of the output shaft 33 of the brushless motor 30 into reciprocating force of the piston 23 will be described. First, a crank shaft 106 is freely rotatably provided in the intermediate case 14. The crank shaft 106 is parallel to the output shaft 33, and a driven gear 107 provided to the crank shaft 106 is meshed with the drive gear 38. A crank pin 108 eccentric from a rotation center of the crank shaft 106 is attached to the crank shaft 106.

Further, a connecting rod 109 that connects the crank pin 108 and the piston 23 in a power transmittable manner is provided. Then, when the rotational force of the output shaft 33 is transmitted to the crank shaft 106 and the crank pin 108 revolves, the piston 23 is reciprocated in the cylinder 18. The power conversion mechanism 120 is constituted by the crank shaft 106, the crank pin 108, and the connecting rod 109.

A usage example of the electric work machine 10 will be described. When the operator operates the trigger 141 to turn ON or OFF the trigger switch 26, an ON signal or an OFF signal output from the trigger switch detection circuit 70 is sent to the controller 136. When the ON signal is input to the controller 136, the control signal output from the control signal output circuit 134 is input to the switching circuit 121, the switching elements Tr1 to Tr6 are individually turned ON and OFF, and the current flows in the coils U1, V1, and W1 in order. Then, the coils U1, V1, and W1 and the permanent magnet 32b are in cooperation with each other to form a rotating magnetic field, and the rotor 32 of the brushless motor 30 is rotated.

The controller 136 executes control to make the actual rotation number of the rotor 32 close to the target rotation number. The actual rotation number of the rotor 32 is controlled by adjusting voltages to be applied to the respective coils U1, V1, and W1. To be specific, the control is performed by adjusting a duty ratio of the ON signal to be applied to the respective gates of the switching elements Tr1 to Tr6 of the switching circuit 121.

When the rotor 32 of the brushless motor 30 is rotated, the rotational force of the output shaft 33 is converted into reciprocating force of the piston 23 by the power conversion mechanism 120, and the piston 23 is reciprocated in the cylinder 18.

When the piston 23 is operated in a direction approaching the crank shaft 106, pressure in the air chamber 24 is decreased, and the striker 22 is moved in a direction away from the intermediate striker 21. When the striker 22 is moved in the direction away from the intermediate striker 21, the air becomes unsucked into the air chamber 24. In addition, when the piston 23 reaches a top dead center, the piston 23 is moved from the top dead center toward a bottom dead center, and the pressure in the air chamber 24 is increased. Then, the striker 22 strikes the intermediate striker 21. Striking force applied to the intermediate striker 21 is transmitted to an object through the tip tool 11. Hereafter, while the output shaft 33 of the brushless motor 30 is rotated, the striker 22 is reciprocated in the cylinder 18 and the striker 22 intermittently strikes the intermediate striker 21.

When the work machine main body 12 vibrates in the direction along the axial line A1 as the piston 23 is reciprocated and the striker 22 intermittently strikes the intermediate striker 21, a weight 126 swings, having the spindle 125 as a fulcrum, and reduces the vibration of the work machine main body 12.

Meanwhile, the rotational force of the output shaft 33 of the brushless motor 30 is transmitted to the rotational force transmission shaft 110 through the drive gear 112. When the mode switch dial 123 is operated and a striking/rotation mode is selected, the rotational force of the rotational force transmission shaft 110 is transmitted to the cylinder 18, and the cylinder 18 is rotated. Rotational force of the cylinder 18 is transmitted to the tip tool 11 through the tool holder 19. In this way, the electric work machine 10 transmits the striking force and the rotational force to the tip tool 11. In contrast, when the mode switch dial 123 is operated and a striking mode is selected, the rotational force of the rotational force transmission shaft 110 is not transmitted to the cylinder 18.

Further, when the output shaft 33 of the brushless motor 30 is rotated, the cooling fan 41 is rotated, and the air outside the work machine main body 12 passes through the suction port 17a and the shaft hole 29 and is sucked into the motor case 27. Then, the air flows in the motor case 27 along a circulation path D7, and heat of the brushless motor 30 is transmitted to the air, and the brushless motor 30 is cooled. The air flowing along the circulation path D7 is sent into the cylinder housing 13 by the cooling fan 41.

Further, the air outside the motor housing 20 passes through the suction port 14a and is sucked into the intermediate case 14. The air sucked into the intermediate case 14 enters the accommodating chamber 130. As illustrated in FIGS. 5(B) and 6(A), while the air flows through the circulation path D1 in the accommodating chamber 130, the air takes the heat of the rectification circuit 53 and the switching elements Tr1 to Tr6 and passes through the passage 87 and is discharged to the motor case 27. In this way, the circulation path D1 and the circulation path D7 are formed in the work machine main body 12 in parallel to each other.

As described above, the air to which the heat of the brushless motor 30, the rectification circuit 53, and the switching circuit 121 has been transmitted is sucked by the cooling fan 41 in the motor case 27 and is discharged through the discharge port 44 into the cylinder housing 13. The air flowing into the cylinder housing 13 is discharged through the exhaust port 146 to the outside of the work machine main body 12.

In this way, when the air flows through the circulation path D1 in the accommodating chamber 130, a temperature increase of the rectification circuit 53 and the switching elements Tr1 to Tr6 is suppressed. Since the switching elements Tr1 to Tr6 are arranged along the flow direction of the air, the air smoothly flows, and coolability can be secured. Further, the rectification circuit 53 is arranged in the uppermost stream in the flow direction of the air in the circulation path D1. Therefore, the coolability to the rectification circuit 53 having a larger heat generation amount than the switching circuit 121 can be secured.

Further, each bottom of the grooves 138 formed between the plurality of fins 137 is parallel to the surface 53a. The air flowing in the accommodating chamber 130 is guided toward the switching elements Tr1 to Tr6 through the grooves 138. Therefore, the coolability of the switching elements Tr1 to Tr6 can be secured. Further, since the bottom of the groove 138 is inclined with respect to the axial line B1, flow resistance of the air can be reduced.

Further, the control substrate 71 to which the rectification circuit 53 and the switching circuit 121 are attached is attached to the main body portion 129. Therefore, in assembling the substrate unit 143, when the control substrate 71 to which the rectification circuit 53 and the switching circuit 121 are attached is attached to the main body portion 129, the substrate unit 143 can be assembled. Therefore, assembling the substrate unit 143 is easy. Further, since the circulation path D1 and the circulation path D7 are formed in parallel to each other, the air to which the heat has been transmitted from the brushless motor 30 can be prevented from flowing into the accommodating chamber 130.

First Modification Example

FIGS. 8 to 10 illustrate a first modification example of the substrate unit 143. In the substrate unit 143 illustrated in FIGS. 8 to 10, arrangement positions of the rectification circuit 53 and the switching circuit 121 in the accommodating chamber 130 are changed, and a structure of the substrate case 82 is different from that of the substrate unit 143 in FIGS. 4 to 6.

The substrate case 82 in the first modification example includes a cover 131 that forms the accommodating chamber 130 together with the main body portion 129. The main body portion 129 is arranged between the cover 131 and the motor case 27 in the direction along the axial line A1. A configuration of the substrate case 82 is similar to that of the substrate case 82 illustrated in FIGS. 4 to 6.

The cover 131 is molded with an insulating material, for example, a synthetic resin. The cover 131 includes a plate portion 132 and a side wall 133 provided along an outer periphery of the plate portion 132. When the main body portion 129 and the cover 131 are fixed with each other, a part of the side wall 133 is arranged outside the side wall 84.

A suction port 133a is provided in a place closest to the suction port 14a in the direction along the axial line B1 in the side wall 133. Through the suction port 133a, the accommodating chamber 130 and an outside of the substrate case 82 are communicated with each other. That is, the accommodating chamber 130 is communicated with the outside of the work machine main body 12 through the suction port 133a and the suction port 14a. Further, the suction port 133a is arranged between the passage 87 and the suction port 14a in the direction along the axial line B1. The passage 87 is arranged between the suction port 133a and the exhaust port 146 in the direction along the axial line B1.

In this way, the cover 131 is provided in the first modification example, whereby cooling air can be concentrated into the substrate case 82, and coolability is improved.

In the substrate unit 143 in FIGS. 8 to 10, the same configuration as the substrate unit 143 in FIGS. 4 to 6 is denoted with the same reference character as FIG. 5. The side wall 84 of the main body portion 129 illustrated in FIG. 8 includes a first component piece 84a along the axial line B1 and a second component piece 84b at a right angle to the first component piece 84a. A suction port 84c that penetrates the first component piece 84a is provided, and a suction port 84d that penetrates the second component piece 84b is provided.

The suction ports 84c and 84d are passages through which the accommodating chamber 130 and the outside of the substrate case 82 are communicated with each other. The second component piece 84b is arranged in a place of the main body portion 129, the place being closest to the suction port 133a in the direction along the axial line B1. The rectification circuit 53 is arranged between the switching circuit 121 and the second component piece 84b in the direction along the axial line 131. The surface 53a of the rectification circuit 53 is parallel to the axial line B1 and the first component piece 84a. The heat sink 78 and the rectification circuit 53 are arranged in the same range in a direction perpendicular to the axial line B1. The rectification circuit 53 and switching elements Tr1, Tr3, and Tr5 are arranged in one line in the direction along the axial line 131. The heat sink 135 has a plate shape and is not provided with a fin 137. Arrangement positions of the rectification circuit 53 and the heat sink 135 are off the axial line B1 in side view of the substrate unit 143.

In the substrate unit 143 in FIGS. 8 to 10, air passing through the suction port 84d and sucked into the accommodating chamber 130 flows along the circulation path D1 and is moved through the passage 87 into the motor case 27. Air passing through the suction port 84c and sucked into the accommodating chamber 130 flows along a circulation path D3 and is joined with the air in the circulation path D1. Heat of the rectification circuit 53 and heat of the switching elements Tr1 to Tr6 are transmitted to the air sucked into the accommodating chamber 130. Therefore, a temperature increase of each of the rectification circuit 53 and the switching elements Tr1 to Tr6 is suppressed.

In the substrate unit 143 in FIGS. 8 to 10, the rectification circuit 53 is arranged in the uppermost stream in the accommodating chamber 130 in the flow direction of the air in the circulation path D1. Further, a distance from the rectification circuit 53 to the suction port 133a is shorter than a distance from the switching elements Tr1 and Tr2 to the suction port 133a in the direction along the axial line B1. Therefore, the rectification circuit 53 can be efficiently cooled. Further, the air passing through the suction port 84c and sucked into the accommodating chamber 130 flows in the circulation path D3 in a direction intersecting with the circulation path D1 as illustrated in FIG. 8. The suction port 84d differs from the suction port 84c in flow direction of the air sucked into the accommodating chamber 130. The air flowing in the circulation path D3 collides with the heat sink 135 and is then joined with the air in the circulation path D1. Since the air flowing along the circulation path D3 collides with a surface of the heat sink 135, the flow of the air is largely changed in the perpendicular direction before and after the air collides with the surface of the heat sink 135, and a "peeling phenomenon" occurs, in which the flow of the air forms a layer and peels off from the surface of the heat sink 135. Therefore, heat transmission efficiency to the air is improved.

Further, a part of the air sucked into the accommodating chamber 130 of the substrate case 82 flows between the plate portion 132, and the switching circuit 121 and the rectification circuit 53, and forms a circulation path D2, and the air flowing in the circulation path D2 is joined with the air flowing in the circulation path D1, as illustrated in FIG. 10. The air flowing in the circulation path D2 takes the heat of the switching circuit 121 and the rectification circuit 53 to suppress the temperature increase of the switching circuit 121 and the rectification circuit 53. Note that the air sucked into the accommodating chamber 130 can pass through a place other than the circulation paths D1 and D2, and the air is moved through the passage 87 to the motor case 27.

Further, in the substrate unit 143 in FIG. 8, since the air passes through the suction ports 84d and 84c, the flow of the air being blocked by the side wall 84 can be suppressed, and the flow of the air can be made smooth. In the substrate unit 143 in FIG. 8, the direction of the flow of the air that cools the rectification circuit 53 and the direction of the flow of the air that cools the switching circuit 121 are the same, and the flow of the air in the circulation path D1 becomes smooth.

Second Modification Example

FIG. 11 illustrates a second modification example of the substrate unit 143. In the substrate unit 143 in FIG. 11, the same structure as the substrate units 143 in FIGS. 4 to 6 and in FIGS. 8 to 10 is denoted with the same reference character as the substrate units 143 in FIGS. 4 to 6 and in FIG. 8. The axial line B1 traverses arrangement ranges of the rectification circuit 53 and the heat sink 135 in side view of the substrate unit 143 in FIG. 11. Further, the substrate case 82 includes the cover 131 illustrated in FIGS. 9 and 10 although not illustrated in FIG. 11.

The surface 53a of the rectification circuit 53 is perpendicular to the axial line B1 in side view of the substrate unit 143. The heat sink 135 has a plate shape and is not provided with the fin 137. The rectification circuit 53 and the heat sink 135 are arranged in parallel to the second component piece 84b. The rectification circuit 53 and the heat sink 135 are arranged between the switching circuit 121 and the second component piece 84b in the direction along the axial line B1. That is, a distance from the rectification circuit 53 to the suction port 84d is shorter than a distance from the switching elements Tr1 and Tr2 to the suction port 84d in the direction along the axial line B1.

Further, in the substrate unit 143 illustrated in FIG. 11, the heat sink 78 is attached to surfaces of the switching elements Tr1, Tr3, and Tr5, the surfaces being closer to the switching elements Tr2, Tr4, and Tr6. Further, in the substrate unit 143 illustrated in FIG. 11, one sheet of heat sink 144 is attached to surfaces of the switching elements Tr2, Tr4, and Tr6, the surfaces being closer to the switching elements Tr1, Tr3, and Tr5. The heat sink 144 has a plate shape.

In the substrate 143 illustrated in FIG. 11, the same component portion as the substrate units 143 in FIGS. 4 to 6 and in FIG. 8 can exhibit the same effect as the substrate units 143 in FIGS. 4 to 6 and in FIG. 8. Therefore, the rectification circuit 53 can be efficiently cooled.

Further, in the substrate unit 143 illustrated in FIG. 11, air passing through the suction port 84d and sucked into the accommodating chamber 130 collides with the heat sink 135, and a peeling phenomenon occurs. Therefore, heat transmission efficiency to the air is improved. Further, the circulation path D1 as the passage of the air is formed between the heat sink 78 and the heat sink 144.

Third Modification Example

FIG. 12 illustrates a third modification example of the substrate unit 143. In the substrate unit 143 illustrated in FIG. 12, the same structure as the substrate units 143 in FIGS. 4 to 6 and in FIG. 8 is denoted with the same reference character as the substrate units 143 in FIGS. 4 to 6 and in FIG. 8. Further, the substrate case 82 includes the cover 131 illustrated in FIGS. 9 and 10 although not illustrated in FIG. 12. The surface 53a of the rectification circuit 53 is inclined with respect to the axial line B1. Further, the heat sink 135 has a plate shape and is not provided with the fin 137.

Switching elements Tr2, Tr4, and Tr6 and switching elements Tr1, Tr3, and Tr5 are arranged in one line along the axial line B1. The switching elements Tr1, Tr3, and Tr5 are arranged between the switching elements Tr2, Tr4, and Tr6 and the second component piece 84b in the direction along the axial line E1. The switching elements Tr1 to Tr6 are arranged between the passage 87 and the first component piece 84a in the direction intersecting with the axial line B1.

One sheet of the heat sink 144 is attached to the switching elements Tr2, Tr4, and Tr6. The switching elements Tr2, Tr4, and Tr6 are arranged between the heat sink 144 and the first component piece 84a in the direction along the axial line B1. Further, the switching elements Tr1, Tr3, and Tr5 are arranged between the heat sink 78 and the first component piece 84a in the direction along the axial line B1.

The side wall 133 of the cover 131 includes a guide unit 145. The guide unit 145 extends in parallel to the axial line B1 in side view of the substrate unit 143. The guide unit 145 is arranged between the switching elements Tr1 to Tr6 and the first component piece 84a in the direction intersecting with the axial line B1. The suction port 84d is provided in the second component piece 84b.

In the substrate unit 143 in FIG. 12, the same structure as the substrate units 143 in FIGS. 4 to 6 and in FIG. 8 can exhibit the same effect as the substrate units 143 in FIGS. 4 to 6 and in FIG. 8. Further, in the substrate unit 143 in FIG. 12, a flow direction of the air sucked into an accommodating chamber 130 is guided by the guide unit 145 and is guided to the passage 87. Therefore, stagnation of the air sucked into the accommodating chamber 130 can be suppressed, and coolability with respect to the rectification circuit 53 and the switching circuit 121 can be secured.

In the substrate unit 143 in FIG. 12, the switching elements Tr1 to Tr6 are arranged in one line in the direction along the axial line B1. Therefore, an increase in size of the substrate unit 143 in the direction perpendicular to the axial line B1 in side view of the substrate unit 143 can be suppressed.

The heat sink 135 according to the first embodiment may not be provided, and in this case, the air flows along the surface 53a of the rectification circuit 53. Therefore, flow resistance of the air can be reduced.

Second Embodiment

A second embodiment of an electric work machine according to the present invention will be described with reference to FIGS. 13 to 16. An electric work machine 200 according to the second embodiment is a grinder. The electric work machine 200 includes a work machine main body 201, a brushless motor 202 provided in the work machine main body 201, and a substrate unit 203 that controls the brushless motor 202. The work machine main body 201 includes a grip 204, a motor case 205 to which the grip 204 is fixed, and a head cover 206 fixed to a place opposite to a place where the grip 204 is fixed in the motor case 205.

The brushless motor 202 is arranged in the motor case 205, and the brushless motor 202 includes a stator 207 fixed to the motor case 205, and a rotor 208 arranged inside the stator 207. The stator 207 includes a coil wound around a stator core. The rotor 208 includes a rotor core and a permanent magnet attached to the rotor core. The coil of the stator 207 is conducted to form a rotating magnetic field, and the rotor 208 is rotated. An output shaft 209 having an outer peripheral surface to which the rotor 208 is fixed is provided. The output shaft 209 is arranged from an inside of the motor case 205 to an inside of the head cover 206 and is rotatably supported centered around an axial line E1 by two bearings 210 and 211.

A partition wall 212 that partitions the inside of the motor case 205 and the inside of the head cover 206 is provided. The bearing 210 is supported by the partition wall 212. A cylindrical boss portion 213 is provided in the motor case 205, and the bearing 211 is supported by the boss portion 213. The brushless motor 202 is arranged between a cooling fan 220 and the boss portion 213 in a direction along the axial line E1.

The head cover 206 is provided with a tool support shaft 215 rotatably supported centered around an axial line E2 by a bearing 214. A disk-like grindstone 216 is attached to a portion of the tool support shaft 215, the portion being arranged outside the head cover 206. A deceleration mechanism 217 is provided in the head cover 206. The deceleration mechanism 217 transmits rotational force of the output shaft 209 to the tool support shaft 215 and makes the rotation number of the tool support shaft 215 lower than the rotation number of the output shaft 209.

The deceleration mechanism 217 includes a first gear 218 provided to the output shaft 209 and a second gear 219 provided to the tool support shaft 215 and meshed with the first gear 218. The number of teeth of the first gear 218 is smaller than the number of teeth of the second gear 219.

The cooling fan 220 is provided between the brushless motor 202 and the partition wall 212 in the motor case 205 in the direction along the axial line E1. The cooling fan 220 is integrally rotated with the output shaft 209. Further, the motor case 205 is provided with a trigger 221 operated by an operator.

The substrate unit 203 is provided in the grip 204. The grip 204 includes a cylindrical main body 204a and an end plate 204b that blocks an opposite side of the motor case 205 in the main body 204a. A feed cable 227 is attached to the end plate 204b. A first end portion of the feed cable 227 is connected to a control substrate 222 through a lead wire, and a second end portion of the feed cable 227 is connected to an alternating current power source through a plug.

The substrate unit 203 includes the control substrate 222, a switching circuit 223 attached to the control substrate 222, a rectification circuit 224 attached to the control substrate 222, and a substrate case 226 that supports the control substrate 222. The rectification circuit 224 is configured in the same manner as the rectification circuit 53 in FIG. 2. The substrate case 226 includes a plate-like main body portion 226a and two side walls 226b and 226c provided to an outer peripheral edge of the main body portion 226a. The two side walls 226b and 226c are arranged in parallel to each other and in parallel to the axial line E1. The axial line E1 is arranged between the side wall 226b and the side wall 226c in front view of the electric work machine 200.

The switching circuit 223 includes six switching elements Tr1 to Tr6. The switching circuit 223 is arranged between the axial line E1 and the side wall 226b in front view of the electric work machine 200. Further, the rectification circuit 224 is arranged between the switching circuit 223 and the end plate 204b in the direction along the axial line E1. Further, the rectification circuit 224 is arranged between the switching circuit 223 and the side wall 226c in a direction intersecting with the axial line E1. The axial line E1 passes through an arrangement position of the rectification circuit 224 in front view of the electric work machine 200, and a surface 224a of the rectification circuit 224 is inclined with respect to the axial line E1 in side view of the electric work machine 200. The surface 224a is inclined in a direction approaching the switching circuit 223 with approaching from the side wall 226c to the side wall 226b.

A heat sink 225 is attached to the surface 224a and includes a plurality of fins 228. The plurality of fins 228 are arranged in a thickness direction of the control substrate 222 and are arranged in parallel to one another at intervals. Grooves 246 are formed between the plurality of fins 228. Each bottom of the grooves 246 is parallel to the surface 224a in front view of the control substrate 222.

Next, a mechanism to circulate the air in the work machine main body 201 will be described. First, a suction port 229 penetrating the main body 204a of the grip 204 in a radial direction is provided. The suction port 229 is arranged between the rectification circuit 224 and the end plate 204b in the direction along the axial line E1. A plurality of the suction ports 229 are provided at intervals in the direction along the axial line E1. Further, a plurality of the suction ports 229 are provided at intervals in a circumferential direction of the main body 204a.

Further, an inside of the grip 204 and the inside of the motor case 205 are communicated with each other. Further, the partition wall 212 is provided with a passage 212a, and the air can be circulated between the inside of the motor case 205 and the inside of the head cover 206. Further, the head cover 206 is provided with an exhaust port 206a, and through the exhaust port 206a, the inside of the head cover 206 and an outside of the work machine main body 201 are communicated with each other.

Next, a usage example and control of the electric work machine 200 will be described. When the trigger 221 is not operated, no voltage is applied to a coil of the brushless motor 202, and the output shaft 209 remains stopped. When the trigger 221 is operated, ON and OFF of the switching elements Tr1 to Tr6 of the switching circuit 223 are controlled, and a voltage is applied to the coil of the brushless motor 202. Then, a rotating magnetic field is formed, and the output shaft 209 is rotated. Rotational force of the first gear 218 rotated together with the output shaft 209 is transmitted to the tool support shaft 215 through the second gear 219. As a result, the grindstone 216 is rotated and can grind an object.

When the cooling fan 220 is rotated together with the output shaft 209, the air outside the work machine main body 201 passes through the suction port 229 and is sucked into the grip 204. The air sucked into the grip 204 flows along a circulation path D4, heat of the rectification circuit 244 and the switching circuit 223 is transmitted to the air, and the rectification circuit 244 and the switching circuit 223 are cooled. The rectification circuit 224 is arranged upstream of the switching circuit 223 in a flow direction of the air in the circulation path D4. A distance from the rectification circuit 224 to the suction port 229 is shorter than a distance from the switching circuit 223 to the suction port 229. Therefore, by cooling the rectification circuit 224 having a larger heat generation amount than the switching circuit 223 first, efficient cooling can be achieved.

Further, a part of the air flowing in the circulation path D4 flows along the bottom of the groove 246 of the heat sink 225, and thus, a direction of the air is guided to approach the switching circuit 223. Therefore, flow resistance of the air can be reduced. Further, the air flowing along the circulation path D4 passes through between the switching elements. Further, the plurality of switching elements Tr1 to Tr6 are arranged along the flow direction of the air. Therefore, coolability to the switching circuit 223 is improved.

As described above, the air flowing in the grip 204 flows into the motor case 205 and takes heat of the brushless motor 202 in the process of flowing along a circulation path D5 to cool the brushless motor 202. The circulation path D5 is formed downstream of the circulation path D4 in the flow direction of the air. The air in the motor case 205 is sucked and discharged by the cooling fan 220, and a part of the air discharged from the cooling fan 220 flows in the passage 212a and the head cover 206 along a circulation path D6 and is discharged through an exhaust port 206a to the outside of the work machine main body 201. A part of the air discharged from the cooling fan 220 is directly discharged through the passage 212a to the outside of the work machine main body 201. The circulation paths D4, D5, and D6 indicate a part of the flow of the air, and the air also flows in portions other than the circulation paths D4, D5, and D6. The circulation path D5 is formed downstream of the circulation path D4 in the flow direction of the air. Therefore, the air to which the heat is transmitted from the brushless motor 202 can be prevented from flowing into the grip 204.

The electric work machine 200 of the second embodiment may not be provided with the heat sink 225. In this case, the direction of the air flowing in the circulation path D4 is guided by the surface 224a of the rectification circuit 224 and heads for the switching circuit 223. Therefore, the flow resistance of the air is reduced. The control circuit in FIG. 2 can be used as a control circuit of the electric work machine 200. The permanent magnet 45 and the connection substrate 47 in FIG. 2 are not provided in the electric work machine 200 in FIG. 13. The rectification circuit 224 and the switching circuit 223 are attached to the control substrate 222. Therefore, in a process of assembling the electric work machine 200, the control substrate 222 to which the rectification circuit 224 and the switching circuit 223 are attached may be only installed into the grip 204, making assembling of the electric work machine 200 easy.

Describing corresponding relation between the configuration of the electric work machine according to the first embodiment and a configuration of the present invention, the tip tool 11 corresponds to a work tool of the present invention, the brushless motor 30 corresponds to an electric motor of the present invention, the electric work machine 10 corresponds to an electric work machine of the present invention, the rectification circuit 53 corresponds to a rectification circuit of the present invention, the switching circuit 121 corresponds to a switching circuit of the present invention, the work machine main body 12 corresponds to a casing of the present invention, the suction ports 14a, 84d, 84c, and 133a correspond to a suction port of the present invention, the exhaust port 146 corresponds to an exhaust port of the present invention, and the circulation path D1 corresponds to a first circulation path of the present invention.

Further, the switching circuit 121 and the capacitor 54a correspond to electrical components of the present invention, the diode element 53b corresponds to a diode element of the present invention, the heat sink 135 corresponds to a first heat sink of the present invention, the heat sinks 78 to 81 and 144 corresponds to a second heat sink of the present invention, the surface 53a of the rectification circuit 53 corresponds to a first guide unit of the present invention, and the bottom of the groove 138 corresponds to a second guide unit of the present invention. The suction port 84d and the suction port 84c correspond to "a plurality of suction ports having different directions of the flow of the air" in the present invention. Further, the switching elements Tr1 to Tr6 correspond to switching elements of the present invention, the cooling fan 41 corresponds to a cooling fan of the present invention, the substrate case 82 corresponds to a substrate case of the present invention, and the guide unit 145 corresponds to a third guide unit of the present invention.

Describing corresponding relation between the configuration of the electric work machine according to the second embodiment and the configuration of the present invention, the grindstone 216 corresponds to the work tool of the present invention, the brushless motor 202 corresponds to the electric motor of the present invention, the rectification circuit 224 corresponds to the rectification circuit of the present invention, the switching circuit 223 corresponds to the switching circuit of the present invention, the work machine main body 201 corresponds to the casing of the present invention, the suction port 229 corresponds to the suction port of the present invention, and the exhaust port 206a and the passage 212a correspond to the exhaust port of the present invention.

Further, the circulation path D4 corresponds to the first circulation path of the present invention, the circulation path D7 corresponds to a second circulation path of the present invention, the switching circuit 223 corresponds to the electrical component of the present invention, the switching elements Tr1 to Tr6 correspond to the switching elements of the present invention, and the heat sink 225 corresponds to the first heat sink of the present invention. The surface 224a of the rectification circuit 224 corresponds to the first guide unit of the present invention, and the bottom of the groove 246 corresponds to the second guide unit of the present invention. Further, the cooling fan 220 corresponds to the cooling fan of the present invention, and the substrate case 226 corresponds to the substrate case of the present invention.

The present invention is not limited to the foregoing embodiments, and various modifications and alterations can be made within the scope of the present invention. For example, the suction port 84d illustrated in FIG. 8 may be provided in the main body portion 129 illustrated in FIGS. 4 to 6. Further, the electric work machine of the present invention may be a drill or a driver that provides the rotational force to the tip tool and does not apply the striking force in the axial line direction. Further, the electric work machine of the present invention may be an impact driver or an impact drill that applies the rotational force and the striking force in the rotating direction to the tip tool. The electric work machine of the present invention may be a jig saw or a saber saw that reciprocates the tip tool. According to the present invention, the operation of the work tool includes the reciprocating operation of the work tool and the rotational operation of the work tool.

EXPLANATION OF REFERENCE CHARACTERS 10, 200 . . . electric work machine, 11 . . . tip tool, 12, 201 . . . work machine main body, 14a, 84c, 84d, 133a, 229 . . . suction port, 30, 202 . . . brushless motor, 41, 220 . . . cooling fan, 53, 224 . . . rectification circuit, 53a, 224a . . . surface, 53b . . . diode element, 54a . . . capacitor, 78 to 81, 135, 144, 225 . . . heat sink, 82, 226 . . . substrate case, 121, 223 . . . switching circuit, 138, 229 . . . groove, 145 . . . guide unit, 146, 206a . . . exhaust port, 212a . . . passage, 216 . . . grindstone, D1, D4, D5, D6, D7 . . . circulation path, Tr1 to Tr6 . . . switching element.

The invention claimed is:

1. An electric work machine comprising:
an electric motor having an output shaft to operate a work tool;
a single control substrate;
a rectification circuit, disposed on and electrically connected to the single control substrate, converting a voltage to be applied to the electric motor from an alternating current voltage to a direct current voltage;
a switching circuit, disposed on and electrically connected to the single control substrate, controlling the electric motor;
a casing that accommodates the single control substrate on which both the rectification circuit and the switching circuit are disposed;
a suction port provided in the casing, air being externally introduced into the casing through the suction port;
an exhaust port provided in the casing, the air being exhausted outside the casing through the exhaust port; and
a first circulation path which is formed in the casing to connect the suction port and the exhaust port and through which the air for cooling the rectification circuit and the switching circuit flows, wherein
the rectification circuit and the switching circuit are disposed on a surface of the single control substrate, the surface has a first side and a second side that is longer than the first side, the second side extending in an axis direction of the output shaft,
the rectification circuit is arranged upstream of the switching circuit in a circulation direction of air in the first circulation path,
the rectification circuit is arranged between the suction port and the switching circuit in the axis direction,
a first heat sink that transmits heat of the rectification circuit to the air and a second heat sink that transmits heat of the switching circuit to the air are further provided,
the switching circuit includes six switching elements, the six switching elements comprising a first group including first to third switching elements and a second group including fourth to sixth switching elements, the first group and the second group are arranged in parallel with each other, the first to third switching elements being aligned along the axis direction, the fourth to sixth switching elements being aligned along the axis direction,
the second heat sink includes a first-second heat sink and a second-second heat sink,
the first-second heat sink has a first surface that is in contact with the first to third switching elements, and a second surface that is opposite to the first surface and is not in contact with any of the six switching elements,
the second-second heat sink has a first surface that is in contact with the fourth to sixth switching elements, and a second surface that is opposite to the first surface and is not in contact with any of the six switching elements,
at least one of the rectification circuit and the first heat sink overlaps one of the six switching element when viewed in the axis direction, and
the at least one of the rectification circuit and the first heat sink guides a part of the air flowing in the first circulation path toward the second surfaces of the first-second heat sink and the second-second heat sink.

2. The electric work machine according to claim 1, wherein
an electrical component that controls the electric motor is provided in the casing, and
a distance from the suction port to the rectification circuit is shorter than a distance from the suction port to the switching circuit and a distance from the electrical component to the suction port.

3. The electric work machine according to claim 1, wherein
the rectification circuit is a bridge circuit including a plurality of diode elements, and
the switching circuit includes a plurality of switching elements.

4. The electric work machine according to claim 3, wherein the first circulation path passes through between the plurality of switching elements.

5. The electric work machine according to claim 1, wherein a first guide unit that guides the air flowing in the first circulation path to the switching circuit is provided.

6. The electric work machine according to claim 5, wherein the first guide unit is provided in the rectification circuit.

7. The electric work machine according to claim 1, wherein the first heat sink includes a second guide unit that guides the air flowing in the first circulation path to the switching circuit.

8. The electric work machine according to claim 1, wherein a direction of a flow of the air that cools the rectification circuit and a direction of a flow of the air that cools the switching circuit are the same in the first circulation path.

9. The electric work machine according to claim 1, wherein the suction port includes a plurality of suction ports having different directions of a flow of the air to be introduced into the casing.

10. The electric work machine according to claim 1, wherein
a cooling fan that is rotated by power of the electric motor is provided in the casing, and
the air outside the casing is sucked into the casing when the cooling fan is rotated.

11. The electric work machine according to claim 10, wherein
a second circulation path in which the air, sucked into the casing by rotation of the cooling fan and cooling the electric motor, flows, is formed in the casing, and
the first circulation path and the second circulation path are in parallel to each other.

12. The electric work machine according to claim 10, wherein
a second circulation path in which the air, sucked into the casing by rotation of the cooling fan and cooling the electric motor, flows, is formed in the casing, and the second circulation path is formed downstream of the first circulation path in a flow direction of the air in the casing.

13. The electric work machine according to claim 1, wherein a substrate case to which the rectification circuit and the switching circuit are attached is provided in the casing.

14. The electric work machine according to claim 13, wherein the substrate case includes a third guide unit that guides a flow direction of the air.

15. The electric work machine according to claim 1, wherein
the second surface of the first-second heat sink faces the second surface of the second-second heat sink, and
the at least one of the rectification circuit and the first heat sink guides the part of the air flowing in the first circulation path between the second surfaces of the first-second heat sink and the second-second heat sink.

16. An electric work machine comprising:
an electric motor having an output shaft to operate a work tool;
a single control substrate;
a rectification circuit, disposed on and electrically connected to the single control substrate, converting a voltage to be applied to the electric motor from an alternating current voltage to a direct current voltage;
a switching circuit, disposed on and electrically connected to the single control substrate, controlling the electric motor;
a casing that accommodates the single control substrate on which both the rectification circuit and the switching circuit are disposed;
a suction port provided in the casing, air being externally introduced into the casing through the suction port;
an exhaust port provided in the casing, the air being exhausted outside the casing through the exhaust port;
a first heat sink that transmits heat of the rectification circuit to the air and a second heat sink that transmits heat of the switching circuit to the air, wherein
the switching circuit includes a plurality of switching elements, the plurality of switching elements comprising a first group and a second group which are arranged in parallel with each other and along an axis direction of the output shaft,
the first heat sink is in contact with the rectification circuit,
the second heat sink includes a first-second heat sink that is in contact with the first group and a second-second heat sink that is in contact with the second group,
the first heat sink and the second heat sink are arranged between the suction port and the exhaust port in the axis direction, and
the first heat sink is arranged between the suction port and the second heat sink in the axis direction.

\* \* \* \* \*